(12) United States Patent
Crisu et al.

(10) Patent No.: US 7,006,110 B2
(45) Date of Patent: Feb. 28, 2006

(54) DETERMINING A COVERAGE MASK FOR A PIXEL

(75) Inventors: Dan Crisu, Bucharest (RO); Sorin Cotofana, Nijmegen (NL); Stamatis Vassiliadis, Pijnacker (NL); Petri Liuha, Tampere (FI)

(73) Assignee: Nokia Corporation, Espoo (FI)

( * ) Notice: Subject to any disclaimer, the term of this patent is extended or adjusted under 35 U.S.C. 154(b) by 137 days.

(21) Appl. No.: 10/414,462

(22) Filed: Apr. 15, 2003

(65) Prior Publication Data

US 2004/0207642 A1 Oct. 21, 2004

(51) Int. Cl.
G09G 5/00 (2006.01)
(52) U.S. Cl. ...................................... 345/626; 345/611
(58) Field of Classification Search ........ 345/619–629, 345/611
See application file for complete search history.

(56) References Cited

U.S. PATENT DOCUMENTS

| | | | |
|---|---|---|---|
| 5,369,739 A | | 11/1994 | Akeley |
| 5,555,359 A | | 9/1996 | Choi et al. |
| 5,742,277 A | | 4/1998 | Gossett et al. |
| H1812 H | * | 11/1999 | Arcuri .................... 345/428 |
| 2001/0055025 A1 | * | 12/2001 | Deering et al. ............ 345/611 |
| 2002/0196256 A1 | * | 12/2002 | Hoppe et al. .............. 345/441 |

FOREIGN PATENT DOCUMENTS

WO 9945502 9/1999

OTHER PUBLICATIONS

Waller et al. "Efficient Coverage Mask Generation for Antialiasing", Nov./Dec. 2000.*
"Sampling and Monte Carlo Integration." Lecture from MIT EE/CS class. □□http://www.google.com/url?sa=U&start=2&q=http://groups.csail.mit.edu/graphics/classes/6.837/F04/lectures/14_Sampling-used6.pdf&e=9707.*
"A New Simple and Efficient Antialiasing With Subpixel Masks," by A. Schilling, Computer Graphics, vol. 25, No. 4, Jul. 1991, pp. 133-141.

(Continued)

Primary Examiner—Matthew C. Bella
Assistant Examiner—Eric Woods
(74) Attorney, Agent, or Firm—Alfred A. Fressola; Ware, Fressola, Van Der Sluys & Adolphson LLP

(57) ABSTRACT

The invention relates to a method, a device, a system and a software program product for determining for a pixel a coverage mask reflecting an orientation and possibly a distance from the pixel center of an original edge vector. The pixel is to be employed for displaying at least a part of a geometric primitive on a display, and the original edge vector represents an oriented edge of the geometric primitive. The method comprises as a first step determining one of four quadrants of a Cartesian coordinate system to which the original edge vector belongs due to its orientation. The original edge vector is then transposed into a predetermined one of the four quadrants. Next, a stored coverage mask is fetched, which is associated at least indirectly to the transposed edge vector. Finally, the fetched coverage mask is transformed to the quadrant to which the original edge vector belongs.

17 Claims, 17 Drawing Sheets

OTHER PUBLICATIONS

"*A Parallel Algorithm for Polygon Rasterization*," by J. Pineda, Computer Graphics, vol. 22, No. 4, Aug. 1988, pp. 17-20.

"*Fast Spheres, Shadows, Textures, Transparencies, and Image Enhancements in Pixel-Planes*," by H. Fuchs et al., Siggraph, vol. 19, No. 3, San Francisco, Jul. 22-26, 1985, pp. 111-120.

"*Filtering Edges for Gray-Scale Displays*," by S. Gupta et al., Computer Graphics, vol. 15, No. 3, Aug. 1981, pp. 1-5.

"*Bresenham's Algorithm With Grey Scale*," by M.L.V. Pitteway et al., Communications of the ACM, vol. 23, No. 11, Nov. 1980, pp. 625-626.

"*Efficient Coverage Mask Generation for Antialiaising*"; IEEE Computer Graphics and Applications, IEEE Inc., New York, US; vol. 20, No. 6; pp. 86-93; Nov. 2000.

\* cited by examiner

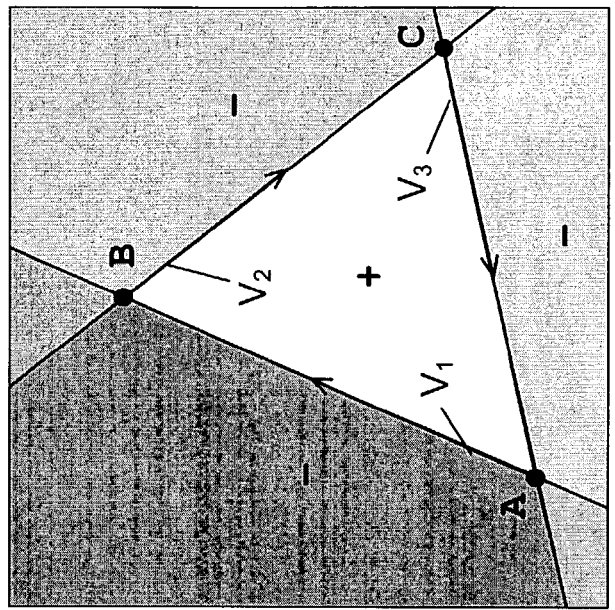
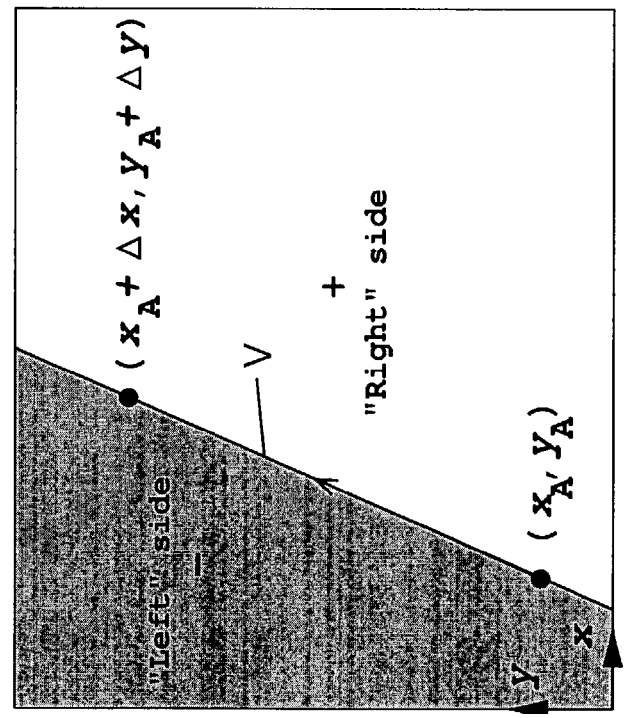
Fig. 1

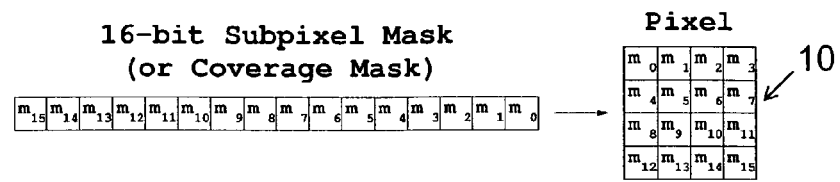
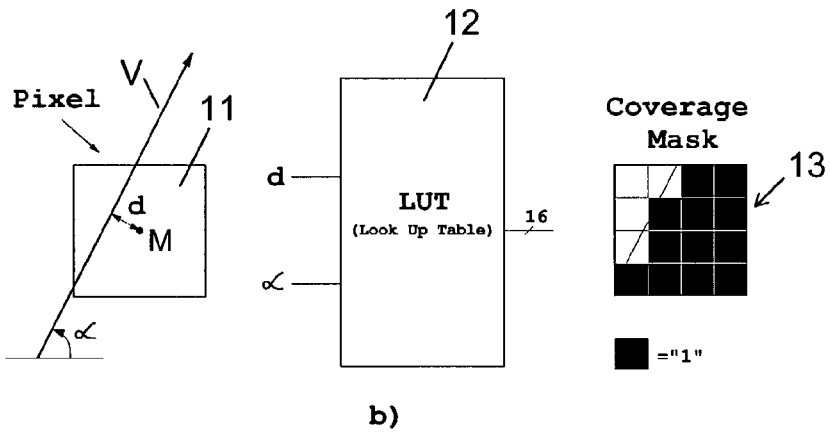
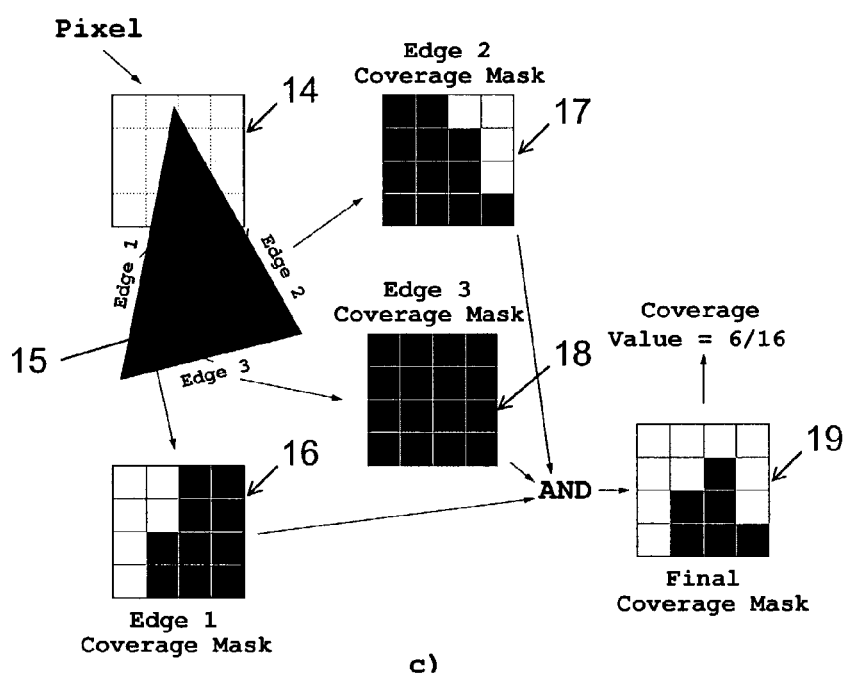
PRIOR ART
Fig. 2

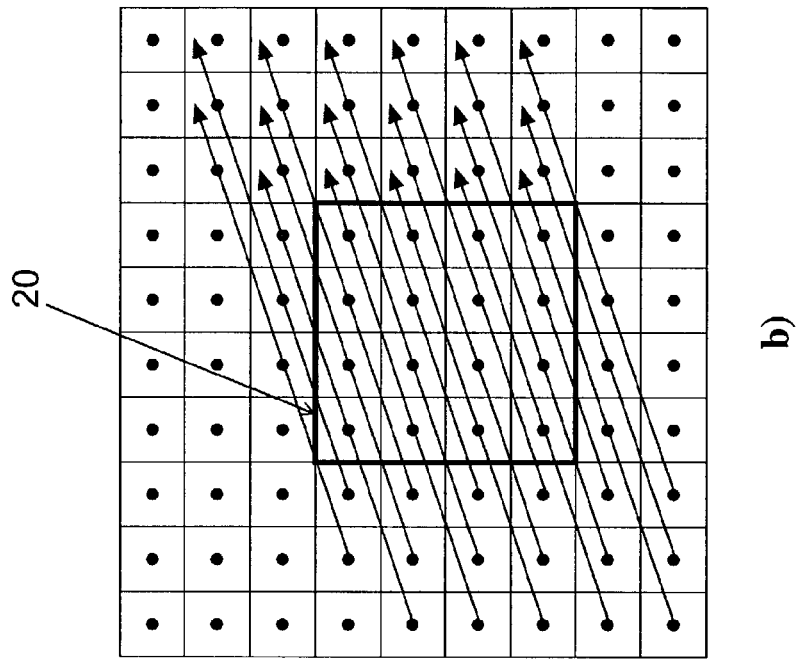
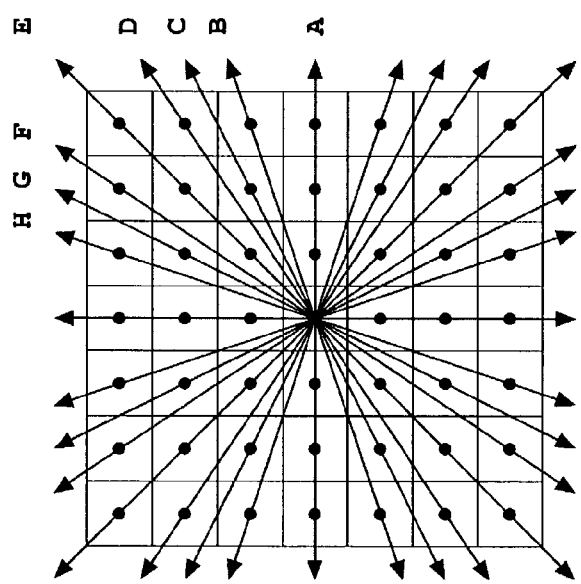
Fig. 3
PRIOR ART

| Range $de_x^{Q1}(\alpha)$ | Disambiguated $de_x^{Q1}(\alpha)$ | $de_x^{ROM\_index\_code}$ (binary) | wrap_around_flag (binary) |
|---|---|---|---|
| $[0, de_x^{Bisector\_AB})$ | $de_x^A$ | 000 | 0 |
| $[de_x^{Bisector\_AB}, de_x^{Bisector\_BC})$ | $de_x^B$ | 001 | 0 |
| $[de_x^{Bisector\_BC}, de_x^{Bisector\_CD})$ | $de_x^C$ | 010 | 0 |
| $[de_x^{Bisector\_CD}, de_x^{Bisector\_DE})$ | $de_x^D$ | 011 | 0 |
| $[de_x^{Bisector\_DE}, de_x^{Bisector\_EF})$ | $de_x^E$ | 100 | 0 |
| $[de_x^{Bisector\_EF}, de_x^{Bisector\_FG})$ | $de_x^F$ | 101 | 0 |
| $[de_x^{Bisector\_FG}, de_x^{Bisector\_GH})$ | $de_x^G$ | 110 | 0 |
| $[de_x^{Bisector\_GH}, de_x^{Bisector\_H\_Vertical})$ | $de_x^H$ | 111 | 0 |
| $[de_x^{Bisector\_H\_Vertical}, +1)$ | $de_x^A$ | 000 | 1 |

Fig. 9

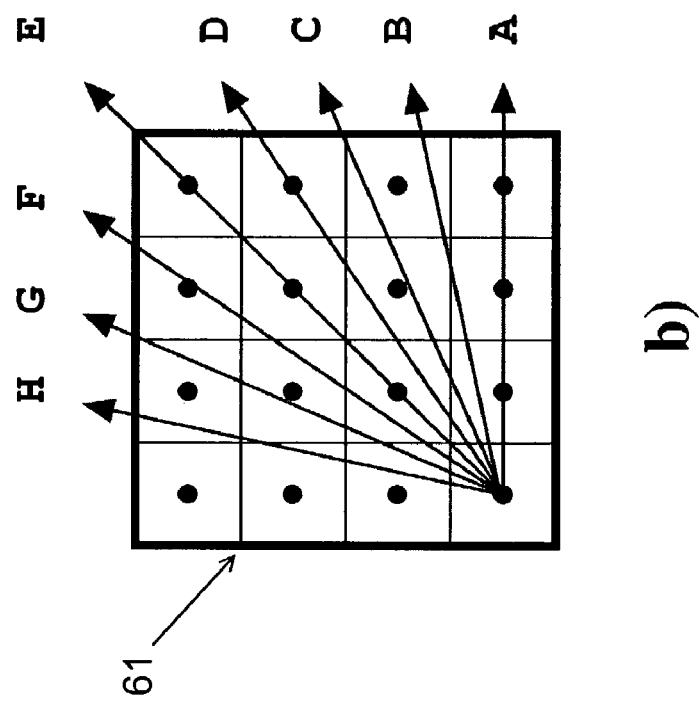
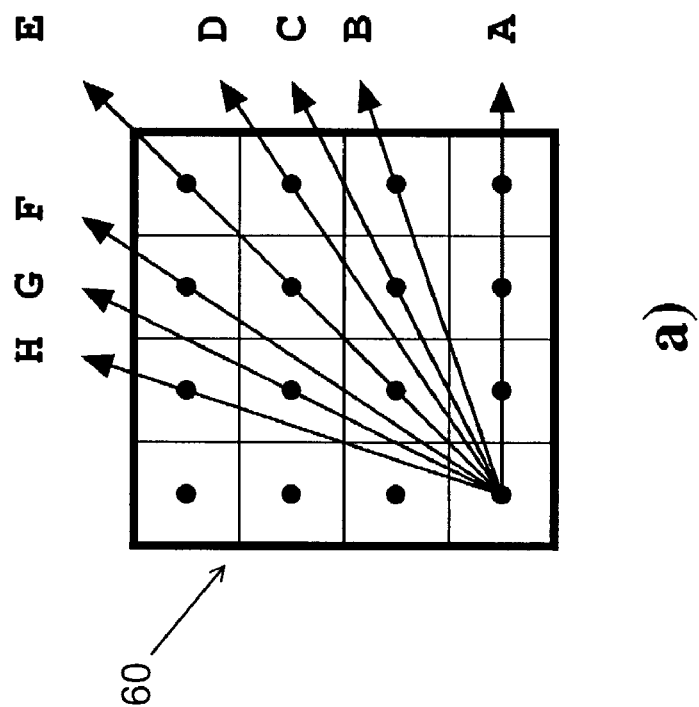
Fig. 11

```
rom_data[0]  = "1111111100000000";      rom_data[36] = "1111111111000000";
rom_data[1]  = "1111111100000000";      rom_data[37] = "1111111111100000";
rom_data[2]  = "1111111110000000";      rom_data[38] = "1111111111100000";
rom_data[3]  = "1111111110000000";      rom_data[39] = "1111111111110000";
rom_data[4]  = "1111111111000000";      rom_data[40] = "1111111111111000";
rom_data[5]  = "1111111111100000";      rom_data[41] = "1111111111111000";
rom_data[6]  = "1111111111100000";      rom_data[42] = "1111111111111100";
rom_data[7]  = "1111111111110000";      rom_data[43] = "1111111111111100";
rom_data[8]  = "1111111111110000";      rom_data[44] = "1111111111111110";
rom_data[9]  = "1111111111110000";      rom_data[45] = "1111111111111110";
rom_data[10] = "1111111111111000";      rom_data[46] = "1111111111111111";
rom_data[11] = "1111111111111000";      rom_data[47] = "1111111111111111";
rom_data[12] = "1111111111111100";      rom_data[48] = "0000000000000000";
rom_data[13] = "1111111111111110";      rom_data[49] = "0000000000000000";
rom_data[14] = "1111111111111110";      rom_data[50] = "0000000000000000";
rom_data[15] = "1111111111111111";      rom_data[51] = "1000000000000000";
rom_data[16] = "0000000000000000";      rom_data[52] = "1000000000000000";
rom_data[17] = "0000000000000000";      rom_data[53] = "1100000000000000";
rom_data[18] = "1000000000000000";      rom_data[54] = "1100000000000000";
rom_data[19] = "1000000000000000";      rom_data[55] = "1110000000000000";
rom_data[20] = "1100000000000000";      rom_data[56] = "1110000000000000";
rom_data[21] = "1110000000000000";      rom_data[57] = "1111000000000000";
rom_data[22] = "1110000000000000";      rom_data[58] = "1111100000000000";
rom_data[23] = "1111000000000000";      rom_data[59] = "1111100000000000";
rom_data[24] = "1111000000000000";      rom_data[60] = "1111110000000000";
rom_data[25] = "1111000000000000";      rom_data[61] = "1111110000000000";
rom_data[26] = "1111100000000000";      rom_data[62] = "1111111000000000";
rom_data[27] = "1111100000000000";      rom_data[63] = "1111111000000000";
rom_data[28] = "1111110000000000";      rom_data[64] = "1111111100000000";
rom_data[29] = "1111111000000000";      rom_data[65] = "1111111110000000";
rom_data[30] = "1111111000000000";      rom_data[66] = "1111111110000000";
rom_data[31] = "1111111100000000";      rom_data[67] = "1111111111000000";
rom_data[32] = "1111111100000000";      rom_data[68] = "1111111111100000";
rom_data[33] = "1111111110000000";      rom_data[69] = "1111111111100000";
rom_data[34] = "1111111110000000";      rom_data[70] = "1111111111110000";
rom_data[35] = "1111111111000000";      rom_data[71] = "1111111111111000";
```

Fig. 12a

```
rom_data[72]  = "1111111111111000";       rom_data[110] = "1111111111111111";
rom_data[73]  = "1111111111111100";       rom_data[111] = "1111111111111111";
rom_data[74]  = "1111111111111100";       rom_data[112] = "0000000000000000";
rom_data[75]  = "1111111111111110";       rom_data[113] = "0000000000000000";
rom_data[76]  = "1111111111111110";       rom_data[114] = "0000000000000000";
rom_data[77]  = "1111111111111111";       rom_data[115] = "0000000000000000";
rom_data[78]  = "1111111111111111";       rom_data[116] = "1000000000000000";
rom_data[79]  = "1111111111111111";       rom_data[117] = "1000000000000000";
rom_data[80]  = "0000000000000000";       rom_data[118] = "1000000000000000";
rom_data[81]  = "0000000000000000";       rom_data[119] = "1100000000000000";
rom_data[82]  = "0000000000000000";       rom_data[120] = "1100000000000000";
rom_data[83]  = "0000000000000000";       rom_data[121] = "1100100000000000";
rom_data[84]  = "1000000000000000";       rom_data[122] = "1100100000000000";
rom_data[85]  = "1000000000000000";       rom_data[123] = "1110100000000000";
rom_data[86]  = "1100000000000000";       rom_data[124] = "1110110000000000";
rom_data[87]  = "1100000000000000";       rom_data[125] = "1111110000000000";
rom_data[88]  = "1110000000000000";       rom_data[126] = "1111110000000000";
rom_data[89]  = "1110000000000000";       rom_data[127] = "1111110010000000";
rom_data[90]  = "1111000000000000";       rom_data[128] = "1110110011001000";
rom_data[91]  = "1111100000000000";       rom_data[129] = "1110111011001000";
rom_data[92]  = "1111100000000000";       rom_data[130] = "1111111011001000";
rom_data[93]  = "1111110000000000";       rom_data[131] = "1111111011001100";
rom_data[94]  = "1111111000000000";       rom_data[132] = "1111111011101100";
rom_data[95]  = "1111111000000000";       rom_data[133] = "1111111011101100";
rom_data[96]  = "1111111010000000";       rom_data[134] = "1111111111101100";
rom_data[97]  = "1111111011000000";       rom_data[135] = "1111111111101100";
rom_data[98]  = "1111111111000000";       rom_data[136] = "1111111111101110";
rom_data[99]  = "1111111111000000";       rom_data[137] = "1111111111101110";
rom_data[100] = "1111111111001000";       rom_data[138] = "1111111111111110";
rom_data[101] = "1111111111101000";       rom_data[139] = "1111111111111110";
rom_data[102] = "1111111111101100";       rom_data[140] = "1111111111111111";
rom_data[103] = "1111111111101100";       rom_data[141] = "1111111111111111";
rom_data[104] = "1111111111111100";       rom_data[142] = "1111111111111111";
rom_data[105] = "1111111111111100";       rom_data[143] = "1111111111111111";
rom_data[106] = "1111111111111110";       rom_data[144] = "0000000000000000";
rom_data[107] = "1111111111111110";       rom_data[145] = "0000000000000000";
rom_data[108] = "1111111111111110";       rom_data[146] = "0000000000000000";
rom_data[109] = "1111111111111111";       rom_data[147] = "0000000000000000";
```

Fig. 12b

```
rom_data[148] = "0000000000000000";
rom_data[149] = "1000000000000000";
rom_data[150] = "1000000000000000";
rom_data[151] = "1000100000000000";
rom_data[152] = "1000100000000000";
rom_data[153] = "1100100000000000";
rom_data[154] = "1100100000000000";
rom_data[155] = "1100100010000000";
rom_data[156] = "1100110010000000";
rom_data[157] = "1100110010000000";
rom_data[158] = "1110110010000000";
rom_data[159] = "1110110010001000";
rom_data[160] = "1110110011001000";
rom_data[161] = "1110111011001000";
rom_data[162] = "1110111011001100";
rom_data[163] = "1110111011001100";
rom_data[164] = "1111111011001100";
rom_data[165] = "1111111011101100";
rom_data[166] = "1111111111101100";
rom_data[167] = "1111111111101100";
rom_data[168] = "1111111111101110";
rom_data[169] = "1111111111101110";
rom_data[170] = "1111111111111110";
rom_data[171] = "1111111111111110";
rom_data[172] = "1111111111111110";
rom_data[173] = "1111111111111111";
rom_data[174] = "1111111111111111";
rom_data[175] = "1111111111111111";
rom_data[176] = "0000000000000000";
rom_data[177] = "0000000000000000";
rom_data[178] = "0000000000000000";
rom_data[179] = "0000000000000000";
rom_data[180] = "1000000000000000";
rom_data[181] = "1000000000000000";
rom_data[182] = "1000000000000000";
rom_data[183] = "1000100000000000";
rom_data[184] = "1000100000000000";
rom_data[185] = "1100100000000000";

rom_data[186] = "1100100000000000";
rom_data[187] = "1100100010000000";
rom_data[188] = "1100110010000000";
rom_data[189] = "1100110010001000";
rom_data[190] = "1100110010001000";
rom_data[191] = "1110110010001000";
rom_data[192] = "1100110011001100";
rom_data[193] = "1110110011001100";
rom_data[194] = "1110110011001100";
rom_data[195] = "1110111011001100";
rom_data[196] = "1110111011101100";
rom_data[197] = "1110111011101100";
rom_data[198] = "1110111011101110";
rom_data[199] = "1111111011101110";
rom_data[200] = "1111111011101110";
rom_data[201] = "1111111111101110";
rom_data[202] = "1111111111111110";
rom_data[203] = "1111111111111110";
rom_data[204] = "1111111111111110";
rom_data[205] = "1111111111111111";
rom_data[206] = "1111111111111111";
rom_data[207] = "1111111111111111";
rom_data[208] = "0000000000000000";
rom_data[209] = "0000000000000000";
rom_data[210] = "0000000000000000";
rom_data[211] = "0000000000000000";
rom_data[212] = "1000000000000000";
rom_data[213] = "1000000000000000";
rom_data[214] = "1000000000000000";
rom_data[215] = "1000100000000000";
rom_data[216] = "1000100010000000";
rom_data[217] = "1000100010000000";
rom_data[218] = "1000100010001000";
rom_data[219] = "1100100010001000";
rom_data[220] = "1100100010001000";
rom_data[221] = "1100110010001000";
rom_data[222] = "1100110011001000";
rom_data[223] = "1100110011001000";
```

Fig. 12c

```
rom_data[224] = "1100110011001100";
rom_data[225] = "1110110011001100";
rom_data[226] = "1110110011001100";
rom_data[227] = "1110111011001100";
rom_data[228] = "1110111011001100";
rom_data[229] = "1110111011101100";
rom_data[230] = "1110111011101100";
rom_data[231] = "1110111011101110";
rom_data[232] = "1111111011101110";
rom_data[233] = "1111111011101110";
rom_data[234] = "1111111111101110";
rom_data[235] = "1111111111101110";
rom_data[236] = "1111111111111110";
rom_data[237] = "1111111111111110";
rom_data[238] = "1111111111111111";
rom_data[239] = "1111111111111111";
rom_data[240] = "0000000000000000";
rom_data[241] = "0000000000000000";
rom_data[242] = "0000000000000000";
rom_data[243] = "1000000000000000";
rom_data[244] = "1000000000000000";
rom_data[245] = "1000100000000000";
rom_data[246] = "1000100000000000";
rom_data[247] = "1000100010000000";
rom_data[248] = "1000100010000000";
rom_data[249] = "1000100010001000";
rom_data[250] = "1100100010001000";
rom_data[251] = "1100100010001000";
rom_data[252] = "1100110010001000";
rom_data[253] = "1100110010001000";
rom_data[254] = "1100110011001000";
rom_data[255] = "1100110011001000";
```

Fig. 12d

DETERMINING A COVERAGE MASK FOR A PIXEL

FIELD OF THE INVENTION

The invention relates to a method for determining for a pixel a coverage mask reflecting an orientation, and preferably as well a distance from the pixel center, of an original edge vector. The pixel is to be employed for displaying at least a part of a geometric primitive on a display, and the original edge vector represents an oriented edge of the geometric primitive. The invention relates equally to a device, a system and a software program product for determining such a coverage mask.

BACKGROUND OF THE INVENTION

In computer graphics, images are displayed on a screen by a discrete grid of pixels. Each pixel represents a dot on the screen. Precisely defined geometric primitives from the continuous object space, like triangles, which are to be displayed on the screen thus have to be rasterized to pixel values. This process involves finding the pixels that are at least partially covered by the primitive and defining the color of the pixels. If a pixel is only partly covered by a primitive, a special approach is required for determining an appropriate color of the pixel. Since in this case, the pixel has at least two primitives that cover it, the color of the pixel has to be an interpolation of the colors of the primitives in the area of the continuous object space represented by this pixel. If this process is not carried out properly, the resulting image suffers from aliasing.

The aliasing phenomenon thus results from the masquerading of high spatial frequencies of the object space as low frequencies in the reconstructed image of the object space on the screen. The aliasing phenomenon creates undesirable visual artifacts known as "jaggies" or "staircasing" effect for the edges of the primitive, resulting in imprecise edges, as "popping" effect for very small primitives which are moving across the screen, or as a "flickering" of the presented image.

In order eliminate the aliasing phenomenon to a certain extent, antialiasing techniques are employed. It is to be noted that a total elimination is not theoretically possible.

Antialiasing techniques are essential for high-quality graphics, and they are endorsed by technical standards like OpenGL and DirectX-Direct3D® by Microsoft®. Antialiasing is of particular importance for products including 3D (three-dimensional) graphics and having a "mid-size" display, i.e. a display resolution less than e.g. VGA (Video Graphics Array) but more than QQVGA (Quarter Quarter VGA). Moreover, an efficient and low-power implementation of antialiasing in a display larger than QQVGA typically requires a hardware acceleration. This is important, for instance, for mobile devices.

The causes of aliasing in computer generated imagery are well known from the signal sampling theory and may be broken into two components. The first component is an aliasing due to inadequate sampling of the geometrical primitive from the continuous object space. The second component is an aliasing due to an incorrect or inadequate reconstruction of the displayed image from the generated samples.

While many antialiasing techniques have been proposed, there are no practical effective solutions to succeed in removing both aliasing components causes at once. Therefore, the practical schemes for antialiasing can be classified in pre- and post-filtering methods.

In the post-filtering antialiasing methods, which are also referred to as supersampling antialiasing methods, the geometric primitives in the continuous object space are point sampled at a higher rate than can be displayed, i.e. with multiple samples per pixel. These samples are then numerically filtered by a discrete digital filter for a resampling at the display resolution. The post-filtering hardware algorithms have increased computation and storage costs due to the multiple sample approach. Moreover, they result in certain situations in image artifacts due to the inadequate sampling rate, since the continuous object space often contains infinite spatial frequencies.

The pre-filtering antialiasing methods, which are also referred to as area sampling antialiasing methods, generate displayed images of a higher quality involving potentially lower hardware costs than post-filtering methods by storing only one sample per pixel. The pre-filtering antialiasing methods remove the high frequency components that would produce aliasing from the image before display by performing a low-pass filtering in a pre-filter stage. The bandwidth limited image is then point sampled at the display resolution to produce images with reduced aliasing. The pre-filtering of a geometric primitive is performed by determining pixel coverage values that are used to weight or smooth pixel colors computed during the sampling. Practical schemes of antialiasing with pre-filtering rely heavily on pre-computed coverage mask lookup tables. Those tables are indexed by parameters that contain information about the distance from the pixel center to the edge of the geometrical primitive, information about the slope of the edge, and information on the possible orientation of the edges. To each index, a coverage mask is associated, which gives an information on the extent to which the pixel is covered by the primitive and which thus allows to weight the pixel colors accordingly.

The antialiasing with pre-filtering is performed during a primitive rasterization time. Simply speaking, the primitive rasterization is the conversion through interpolation from the description of the primitive with two-dimensional vertices in the continuous object space into a sequence of properly shaded pixels on the display that belong to the interior and to the boundary edges of the primitive. If a pixel is found to lie on the border of the primitive, the antialiasing is performed at this time by weighting the color of the pixel with the coverage value of the pixel, in order to smooth the edge. Therefore, the method chosen for primitive rasterization will impose limitations on the type of a pre-filtering antialiasing algorithm that can be efficiently implemented in hardware in conjunction with the rasterization engine.

For illustration, different hardware solutions for rasterization approaches and suitable antialiasing schemes based on pre-filtering will be described in the following. The geometric primitive to be displayed is assumed to be a triangle.

A first type of solution is given by the traditional triangle rasterization and antialiasing.

A traditional triangle rasterization, which is also referred to as triangle scan-conversion, is typically performed by an algorithm consisting of an edge-walking interpolation phase followed by a span interpolation phase in its inner loop. During the edge-walking phase, the triangle is scanned vertically from top to bottom, sequentially delivering for every intercepted display scan-line the triangle boundaries along the two edges visited at a particular time. The triangle boundaries constitute the start and the end of the span interpolation phase. During the edge-walking phase, the edge interpolation is performed using the Bresenham's line algorithm. In Bresenham's line algorithm, the sign bit of a control parameter, which can be computed incrementally, determines the respective next pixel that constitutes the best approximation for the ideal line that has to be drawn by the algorithm. The respectively determined next pixel is output on the screen as part of the drawn line.

Hardware antialiasing algorithms with pre-filtering that are working in conjunction with this traditional triangle scan conversion method have focused on modifying the Bresenham's line algorithm to incorporate an area sampling.

M. L. V. Pitteway and D. Watkinson, for example, propose in the document "Bresenham's Algorithm with Grey Scale", Communications of the ACM, vol. 23, no. 11, pp. 625–626, November 1980, modifications which allow to interpret the control parameter value as a distance measure from the pixel drawn as part of the rasterized line to the ideal line, and to use this control parameter value to weight the color of the pixel that will be displayed. The main drawback of this approach relates to the fact that it cannot handle line ends properly.

Another version of the Bresenham's line algorithm with antialiasing capabilities that can be used to smooth triangle's edges has been described by S. Gupta and R. F. Sproull in the document "Filtering Edges for Gray-Scale Displays", Computer Graphics (SIGGRAPH 81 Conference Proceedings), vol. 15, no. 3, pp. 1–5, August 1981. Here, the ideal line is convolved with a circularly symmetric filter. The convolution operation is implemented with a lookup table, which is indexed by the perpendicular distance from the pixel center to the line center. Analytic expressions for line ends are again difficult to derive, and a separate, more complex indexing scheme is required for that with less precise two-dimensional lookup tables. The computational complexity increases further, when the antialiasing of the triangle's vertices, i.e. of the points where two line ends will intersect, or the antialiasing of triangles smaller than a pixel, i.e. where multiple line ends and vertices exist, are considered making the traditional approach of rasterization less attractive when used in conjunction with the antialiasing algorithms based on pre-filtering.

It is a drawback of the antialiasing algorithms with pre-filtering based on the traditional rasterization method that it is difficult to achieve an accurate antialiasing of the triangle corners and that it is computationally expensive. It is also a drawback of this approach that the triangle traversal order is imposed by the scan conversion algorithm. The triangle is scanned vertically from top to bottom, and for each generated span, all fragments between the span ends are interpolated before the fragments on other spans can be generated. This makes it very difficult to generate several fragments in parallel in a random order and it makes implementations impossible that generate fragments in a tile rasterization order. Several studies of texture caches have shown the benefits of using a tile rasterization order, in which the screen is tiled into rectangles that are related to the size of the texture cache. All fragments within one tile are generated before any fragments within another tile. Similarly, most frame buffers physically tile the screen into rectangular pages, and tiled rasterization that respects these page boundaries allows for fewer page crossings that can be more efficiently prefetched. The traditional rasterization methods are not capable to make efficient usage of such hardware organizations.

A second type of solution for rasterization and antialiasing based on pre-filtering is given by a triangle rasterization with edge functions and antialiasing.

In this type of solution, the triangle rasterization is based on an algebraic representation of the edges of the triangle.

The edge of a triangle can be represented as a vector between its respective vertices, in case respectively one vertex is considered as the source and another vertex as the sink of the vector. This is illustrated in FIG. 1$a$, in which one vertex of a triangle edge is shown as a first dot at a position $(x_A, y_A)$ in a Cartesian coordinate system, and in which another vertex of a triangle edge is shown as a second dot at a position $(x_A+\Delta x, y_A+\Delta y)$ in the Cartesian coordinate system. $\Delta x$ represents the distance in x-direction between the first dot and the second dot, while $\Delta y$ represents the distance in y-direction between the first dot and the second dot. An arrow V connecting the first dot with the second dot constitutes the vector which represents the triangle edge. The edge is thus defined by a vector starting at point $(x_A, y_A)$ and having the slope $\Delta y/\Delta x$.

When proceeding from such an edge vector, it can be detected whether a current rasterization position $(x_M, y_M)$ in the screen space lies in one of the half-planes "left side" or "right side" delimited by the edge vector V or exactly on the edge vector V. The detection process involves the computation of the cross-product of the edge vector V with a vector formed by the edge vector's source $(x_A, y_A)$ and the current rasterization position $(x_M, y_M)$. This cross-product can be expressed for any arbitrary pixel position (x,y) on the screen as an analytical function, called the edge function, with the unknowns (x,y). If the result of an evaluation of the edge function at the current rasterization position $(x_M, y_M)$ is zero, the position $(x_M, y_M)$ lies exactly on the edge defined by edge vector V. Otherwise, depending on the sign of the evaluation's result, the position $(x_M, y_M)$ lies in one of the half-planes delimited by the edge vector V.

When considering a triangle described by its clockwise or counter-clockwise oriented edge vectors, a position belongs to the interior of the triangle, if all its edge functions computed for this position and the three edge vectors have the same sign. This is illustrated in FIG. 1$b$ for a triangle having the vertices A, B and C. The interior of the triangle is formed by the union of the right sides of the oriented edges AB, BC and CA represented by a respective edge vector $V_1$, $V_2$ and $V_3$. A plus sign is associated to the interior of the triangle and a minus sign is associated to the planes delimited by the edge vector $V_1$, $V_2$ and $V_3$ and lying outside of the triangle. The values for the edge functions are used as a "stencil" that allows to modify the color of a pixel only if it is interior to the triangle. Thus, the process of rasterizing the triangle can then be reduced to an algorithm that traverses an arbitrary area that includes the interior of the triangle, and that does not strictly follow the outline of the triangle as in the case of the traditional scan conversion rasterization method.

Additionally, if the edge function is properly normalized, its evaluation yields the distance from the respective edge vector to the pixel position (x,y), and this distance can be used in determining the coverage of the pixel at position (x,y) by the triangle's edge. This means that the normalized edge function can be employed for both, rasterization and antialiasing.

The operating principle of an antialiasing algorithm with edge functions is illustrated in more detail in FIGS. 2$a$, 2$b$ and 2$c$.

FIG. 2$a$ illustrates a 16-bit coverage mask encoding scheme. On the left hand side of FIG. 2$a$, the sequence of the 16 bits of the coverage or subpixel mask is represented by a sequence of 16 squares $m_0$–$m_{15}$. Each of the bits represents a binary value for a subpixel of a two-dimensional 4×4 grid of subpixels. A corresponding 4×4 grid 10 of subpixels, which are associated to the area of a pixel, is shown on the right hand side of FIG. 2a. Each of the subpixels can be individually lit and unlit by setting the corresponding bit $m_0$–$m_{15}$ accordingly. In hardware implementations for antialiasing with normalized edge functions, such pictorial representations of the pixel coverage coded in coverage masks are pre-computed for various distances of an edge to the pixel center and various angles of an edge. The pre-computed coverage masks are stored in a coverage mask lookup table.

FIG. 2b illustrates the fetching of a stored coverage mask from a lookup table. On the left hand side of FIG. 2b, the area 11 of a pixel on a screen is depicted, with an edge vector V passing through this area 11. In the middle of FIG. 2b, a look up table LUT 12 is depicted, and on the right hand side of FIG. 2b, a coverage mask 13 is depicted in form of a 4×4 grid of subpixels. During rasterization, the normalized edge function computed for the current rasterization position $(x_M, y_M)$ is interpreted as a distance d of the edge vector V from the pixel center M. The distance d is used together with the edge slope α as a lookup table address to fetch the 16-bit coverage mask 13 of the current rasterization position for that edge. In the depicted coverage mask 13, black squares represent a bit value of "1" of a respective subpixel, while white squares represent a bit value of "0" of a respective subpixel.

FIG. 2c illustrates the determination of a final coverage value for a pixel using box filtering by ANDing the coverage masks for three edge vectors of a triangle. A first square 14 represents the pixel area which is partly covered by a triangle 15. The table lookup described with reference to FIG. 2b is performed for all the three edges of the triangle 15, resulting in three distinct coverage masks 16, 17 and 18. Each of the coverage masks 16, 17 and 18 is represented in FIG. 2c in form of a 4×4 grid of subpixels. The three resulting coverage masks 16, 17 and 18 are then logically combined by an AND operation to produce a final coverage mask 19. The final coverage mask 19 represents the extent to which the pixel at the current rasterization position $(x_M, y_M)$ is covered by the triangle. From the number of lit subpixels out of the total number of subpixels represented in the final coverage mask 19, the fraction of the pixel covered by the triangle can be computed. In the presented example, 6 of the 16 bits have a value of "1" and are thus considered to be lit, which results in a coverage value of 6/16.

The resulting coverage value is used to modulate the color of the pixel, i.e. the transparency or the alpha value, which is computed by interpolation for the current rasterization position $(x_M, y_M)$.

The scheme presented in FIG. 2c is equivalent with a process of pre-filtering having a box-shaped filter kernel.

The rasterization and antialiasing method presented with reference to FIGS. 2a to 2c was adopted by H. Fuchs et al. in document "Fast Spheres, Shadows, Textures, Transparencies, and Image Enhancements in Pixel-Planes", Computer Graphics (SIGGRAPH 85 Conference Proceedings), vol. 19, no. 3, pp. 111–120, July 1985 in Pixel Planes. Pixel Planes is a logic-enhanced memory system for raster graphics and imaging with a high degree of generality. Using a global computing structure, more specifically a linear expression tree evaluated in a bit-sequential order, the system can evaluate linear expressions like edge functions for every pixel position (x,y) on the screen in parallel. The coverage mask for an edge is fetched by indexing a pre-computed coverage mask lookup table with the normalized edge function value and one of the coefficients of the edge function that gives information about the slope of the edge.

The system is extremely large, since it provides a separate processor for every pixel in the display. Each of the pixel processors contains an 1-bit ALU (arithmetic-logic unit) and a small amount of memory. Pixel-Planes 4, a full-scale system completed in 1986, contained 262144 processors forming a 512-by-512 pixel image.

In the document "A Parallel Algorithm for Polygon Rasterization", Computer Graphics (SIGGRAPH 88 Conference Proceedings), vol. 22, no. 4, pp. 17–20, August 1988, by J. Pineda, an effective expression for the cross-product of the vectors was embodied in the edge function formulation, emphasizing that iterative techniques, with only one addition per pixel, can be used for neighboring pixels to evaluate the edge function. For an edge vector defined by the points $(x_A, y_A)$ and $(x_A+\Delta x, y_A+\Delta y)$, as presented in FIG. 1a, this edge function for a certain point M at position $(x_M, y_M)$, e.g. the center M of a pixel, is expressed as:

$$E(x_M, y_M) = (x_M - x_A) \cdot \Delta y - (y_M - y_A) \cdot \Delta x \qquad (1)$$

The iterative property is well suited for a low-cost rasterizer, which steps through a triangle generating one or a group of fragments at each step. By this new edge function formulation, the method of triangle rasterization of the second presented type of solution is more effective in performance and hardware costs than the traditional rasterization method presented above as first type of solution.

An antialiasing algorithm using coverage masks which are based on the edge function formulation from the above cited document "A Parallel Algorithm for Polygon Rasterization" has been presented by A. Schilling in the document "A New Simple and Efficient Antialiasing with Subpixel Masks", Computer Graphics (SIGGRAPH 91 Conference Proceedings), vol. 25, no. 4, pp. 133–141, July 1991. Each pixel is represented as a matrix of 4×4 subpixels and the associated coverage mask is encoded as a 16-bit word as presented in FIG. 2a. A new formulation for the distance of the edge vector to the pixel center M with a good accuracy based on the edge function normalization with an $L_1$-norm is proposed, which avoids the sum of squares and the square root computation involved by the Euclidian distance evaluation:

$$\begin{aligned} d_{L1}(M) &= \frac{E(x_M, y_M)}{|\Delta x| + |\Delta y|} \qquad (2) \\ &= (x_M - x_A) \cdot \frac{\Delta y}{|\Delta x| + |\Delta y|} - (y_M - y_A) \cdot \frac{\Delta x}{|\Delta x| + |\Delta y|} \\ &= (x_M - x_A) \cdot de_x(\alpha) - (y_M - y_A) \cdot de_y(\alpha) \\ &= \mathrm{sgn}(d_{L1}(M)) \cdot d \cdot \frac{\sqrt{\Delta x^2 + \Delta y^2}}{|\Delta x| + |\Delta y|} \\ &= \mathrm{sgn}(d_{L1}(M)) \cdot f(d, \alpha) \end{aligned}$$

The $L_1$-norm distance $d_{L1}(M)$ and the parameters $de_x(\alpha)$ and $de_y(\alpha)$ are functions of the Euclidian distance d and the angle α presented in FIG. 2b.

Any edge vector in the 2D (two dimensional) space at any Euclidian distance d from the pixel center M and at any angle α can be identified unambiguously using the parameters $d_{L1}(M)$, $de_x(\alpha)$ and $\mathrm{sgn}(de_y(\alpha))$. Since the angle α is difficult to compute per se, the index used to fetch the coverage masks from the coverage mask lookup table can therefore be composed of the parameters $d_{L1}(M)$, $de_x(\alpha)$, and sgn(dey(α)). In a practical implementation, only the coverage masks for partially covered pixels have to be stored in the coverage mask lookup table, imposing the range for the $L_1$-norm distance to be $d_{L1}(M) \in (-0.5, +0.5)$.

Outside this range, the pixel is totally covered or totally uncovered by the triangle edge, and the coverage mask can be assigned implicitly to comprise subpixels which are all set or unset, depending on the sign of the $L_1$-norm distance $d_{L1}(M)$. The ranges for the other parameters that depend on the angle $\alpha$ of the edge vector alone are $de_x(\alpha) \in [-1, +1]$ and $\text{sgn}(de_y(\alpha)) \in \{-1, +1\}$.

In order to limit the coverage masks lookup table to a reasonable size, the edge vectors can be grouped in edge vector classes, and only several representative classes are stored in the coverage masks lookup table. An edge vector class is defined in this context as a set of all the edge vectors with the same $de_x(\alpha)$ and $\text{sgn}(de_y(\alpha))$ values, but with distinct $d_{L1}(M)$ values, the values lying in the above indicated ranges. Hence, an edge vector class contains all the edge vectors with the same slope that may partially cover a pixel.

With a subpixel lattice of 4×4, only 32 representative edge vector classes from all four quadrants of the plane have to be stored, as illustrated in FIGS. 3a and 3b.

FIG. 3a shows an enlarged 7×7 grid of subpixels, in which the subpixels are shown as dotted squares. The 4×4 subpixels in the right upper corner of the enlarged grid represent a first quadrant for vectors of a first orientation. The 4×4 subpixels in the left upper corner of the enlarged grid represent a second quadrant for vectors of a second orientation. The 4×4 subpixels in the left lower corner of the enlarged grid represent a third quadrant for vectors of a third orientation. The 4×4 subpixels in the right lower corner of the enlarged grid represent a fourth quadrant for vectors of a fourth orientation. The middle row and the middle column of subpixels thus belong in common to respectively two of the 4×4 grids of subpixels, while the central subpixel of the enlarged grid belongs in common to all four of the 4×4 grids of subpixels. Further, 32 representative edge vector classes represented through a respective sample edge vector per class are shown, all vectors having their source at the central subpixel of the enlarged grid. Eight of the sample edge vectors are labeled A to H, respectively. The 32 representative edge vector classes were chosen by drawing all possible edge vectors that are passing through the subpixel centers of a pixel when proceeding from the center of the corner subpixels.

FIG. 3b shows the edge vectors belonging to the representative edge vector class B, i.e. all edge vectors having the same slope as the edge vector B of FIG. 3a and having one of 17 possible distances $d_{L1}(M)$ to the center of a 4×4 grid 20 of subpixel.

Then, the coverage mask that will be stored corresponding to an index given by the parameters $d_{L1}(M)$, $de_x(\alpha)$ and $\text{sgn}(de_y(\alpha))$ of an edge vector is computed by ensuring that the number of subpixels lit in the coverage mask is correct plus or minus ½ of a subpixel, based on the exact covered area of the pixel.

The index for an entry in the coverage masks lookup table is obtained by concatenating the truncated $L_1$-norm distance $d_{L1}(M)$ to 5 msb (most significant bits) including the sign bit, the truncated parameter $de_x(\alpha)$ to 5 msb including the sign bit, and one bit for the sign of the parameter $de_y(\alpha)$. Nevertheless, additional redundancy has to be built in the table. On the one hand, it has to be ensured that two adjacent triangles, both front-facing or both back-facing, always complement each other, i.e. a total coverage of more than 4×4 subpixels per pixel is impossible. Adjacent primitives which occupy other than 100% of the pixel lead to color errors like edge cracking. On the other hand, the biasing of a rounding scheme based on truncation towards $-\infty$ has to be counteracted in a two's complement number system. This increases the coverage masks lookup table size to 8000 words of 16 bits comprising 8000 coverage masks.

In contrast to the antialiasing methods with pre-filtering based on the traditional rasterization method, the antialiasing methods with pre-filtering based on normalized edge functions perform the antialiasing of the edge intersections with accuracy. Further, they do not favor any particular order of triangle traversal, which makes them well-suited for a tile rasterization order. However, their hardware implementation, which is based on coverage mask lookup tables, is often inefficient. The coverage mask lookup tables contain thousands of coverage masks that consume a considerable chip area. This leads to a coverage mask lookup table time-sharing access approach and prevents an employment of low-power techniques that capitalize on parallel computation to reduce the activity factor inside the antialiasing circuitry. Large lookup tables are of particular disadvantage for mobile devices. Moreover, the large coverage mask lookup table content combined with the mechanism used to fetch the coverage mask during rasterization is a source of inaccuracies, which has to be minimized by additional measures.

A further document dealing with pre-filter antialiasing techniques is U.S. Pat. No. 5,742,277, which discloses a method where the antialiasing of an internal edge is performed right before display to avoid the problems that arise if this antialiasing is carried out in the blender. This method makes use of the coverage value to form the color of the pixel, but the actual formation of this coverage value is not described. International patent application WO 99/45502 A1 describes a method for creating a coverage alpha value by subsampling the pixels. U.S. Pat. No. 5,369,739 describes a subsampling that can be used for determining the coverage value.

SUMMARY OF THE INVENTION

It is an object of the invention to provide an antialiasing technique with pre-filter, which avoids the above mentioned problems of the prior art solutions.

It is in particular an object of the invention to reduce the required storage space for coverage masks, while maintaining the advantages of the above presented antialiasing with pre-filtering based on normalized edge functions.

A method is proposed for determining for a pixel a coverage mask reflecting an orientation of an original edge vector, which pixel is to be employed for displaying at least a part of a geometric primitive on a display, wherein the original edge vector represents an oriented edge of the geometric primitive. The proposed method comprises the following steps:

a) determining one of four quadrants of a Cartesian coordinate system to which the original edge vector belongs due to its orientation;

b) transposing the original edge vector into a predetermined one of the four quadrants;

c) fetching a stored coverage mask which is associated at least indirectly to the transposed edge vector; and d) transforming the fetched coverage mask to the quadrant to which the original edge vector belongs.

Further, a device determining such a coverage mask is proposed. The proposed device comprises a computing portion for determining one of four quadrants of a Cartesian coordinate system to which an original edge vector belongs due to its orientation. The proposed device moreover comprises a quadrant disambiguation portion for transposing an original edge vector into a predetermined one of the four quadrants. The proposed device moreover comprises a coverage mask look-up portion for fetching a stored coverage mask, which coverage mask is associated at least indirectly to a transposed edge vector provided by the transposing portion. Finally, the proposed device comprises a transformation portion for transforming a coverage mask provided by the coverage mask look-up portion to a quadrant determined by the computing portion.

Further, a graphic presentation system is proposed, which comprises on the one hand a display device and on the other hand a processing device. The processing device includes the same processing portions as the proposed device, and in addition a combining portion for combining transformed coverage masks provided by the transformation portion for a specific pixel and for modifying the color of the pixel for display by the display device based on combined coverage mask.

Finally, a software program product with a program code for determining such a coverage mask is proposed. The program code is suited for carrying out the steps of the proposed method. It is stored on a machine readable carrier and intended for execution by a signal processing component.

The invention proceeds from the consideration that the coverage masks required for the edge vectors of each of the four quadrants correspond to each other in a "rotationally symmetric" manner. That is, if an edge vector, which belongs by its orientation to one quadrant and which requires a specific coverage mask, is rotated in steps of 90°, the resulting edge vectors in the other quadrants will require the same specific coverage mask rotated in corresponding steps of 90°. It is therefore proposed to store only coverage masks for edge vectors belonging by their orientation to a selected one of the quadrants, e.g. to the first quadrant. The coverage masks for edge vectors belonging by their orientation to another quadrant are obtained by a simple transformation of a coverage mask fetched for a corresponding edge vector belonging to the selected quadrant. Transposing the original edge vector into the selected quadrant and transforming the fetched coverage mask to the quadrant of the original edge vector can be achieved for example by a negation and/or rotation operation.

The invention allows a high-quality antialiasing with pre-filtering.

It is an advantage of the invention that it reduces the storage space required for storing the coverage masks significantly, since only a quarter of the coverage masks have to be stored compared to prior art solutions. At the same time, the invention does not increase the number of required computations for the coverage mask look up.

It is moreover an advantage of the invention that it allows an adequate smoothing of edges at all angles, and that it does not discard any fragments whatever their size.

It is equally an advantage of the invention that it is very versatile. It can be applied for example irrespective of the size of the stored coverage masks, and irrespective of the number of the stored coverage masks.

In a preferred embodiment of the invention, each stored coverage mask is associated to a combination of an edge vector of a specific orientation in the first quadrant and of a specific distance of a vector to the center of a respective pixel. In this case, the distance between the original edge vector and the center of the pixel is determined in addition.

A stored coverage mask is then fetched, which is associated on the one hand at least indirectly to the transposed edge vector and on the other hand to the distance determined for the original edge vector. It is an advantage of the invention that it can be applied irrespective of the metric used to measure the position of the edge relative to the currently processed pixel's center.

In a further preferred embodiment of the invention, the invention is employed for determining a coverage mask for each edge of the geometric primitive. The resulting coverage masks for all edges can then be combined to a single coverage mask for a respective pixel. Such a combined coverage mask represents the extend of coverage of the pixel by the geometric primitive. This extend can then be used for modifying the color of the pixel in a known manner. As the storage requirements are reduced, the invention also provides the possibility for edge-level parallelism by replicating the coverage masks look up scheme for every edge of the geometric primitive, and thus for increasing the performance and reducing the power consumption of the antialiasing. In a further preferred embodiment of the invention, representative edge vectors having different, predetermined orientations are defined. The representative edge vectors are distributed by these predetermined orientations in a "rotationally symmetric" manner to the four quadrants of the Cartesian coordinate system. That is, if the set of representative edge vectors defined for one quadrant is rotated in steps of 90°, the resulting edge vectors correspond exactly to the set of another quadrant. In this case, one of the representative edge vectors in the predetermined quadrant is selected, which has a similar orientation as the transposed edge vector. Then a stored coverage mask is fetched, which is associated to the selected representative edge vector and thereby indirectly to the transposed edge vector. Since the final occupation of a coverage mask is determined making use of a "rotational symmetry", a 100% occupation of two adjacent primitives is achieved, and a pixel color can therefore be determined accurately in all situations.

In a further preferred embodiment of the invention, the predetermined orientations for the representative edge vectors are selected such that the representative edge vectors are distributed uniformly over an angle-related space, e.g. the $de_x(\alpha)$ space, to the four quadrants. Thereby, the accuracy of a coverage value indicating the extend of the coverage of a pixel by a geometric primitive, which is determined based on the invention, is higher than the accuracy of a coverage value obtained in the prior art. Also, such an adjusted distribution does not result in any deflection from the 100% occupation of two adjacent primitives due to the "rotational symmetry".

The orientation of the edges of a geometric primitive can be clockwise or counter-clockwise. Advantageously, dedicated coverage masks are stored only for one of these possible orientations. A fetched coverage mask is then corrected afterwards, in case the underlying geometric primitive has an orientation for which no dedicated coverage masks are stored. The invention can thus be realized in a triangle traversal order independent manner.

The proposed method can be implemented in hardware, for instance as part of a 2D/3D graphics hardware accelerator, or in software, for instance as part of a software graphics pipeline. It has to be noted, however, that an implementation in software implies a great performance loss, as the coverage masks transformations are very costly in software.

If implemented by hardware, the proposed method can be pipelined or parallelized, or a combination of these.

The invention is further data representation independent, allowing hardware embodiments to use internally any data representation that is considered to be suitable for boosting up the throughput or for the reducing power consumption. Possible data representations are e.g. two's complement, signed magnitude, etc.

Since a lookup table used for storing the coverage masks required according to the invention will be small, it can be replicated per edge to reduce the activity factor inside the processing components realizing the antialiasing to lower the power consumption.

The invention can be used for the purpose of antialiasing of any object whose edges can be described with edge functions, i.e. not only for triangles.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 1a illustrates a representation of a triangle edge as a vector as known from the prior art;

FIG. 1b illustrates the association of an arbitrary position to the interior or exterior of a triangle as known from the prior art;

FIG. 2a illustrates a 16-bit coverage mask encoding scheme as known from the prior art;

FIG. 2b illustrates the fetching of a coverage mask from a lookup table as known from the prior art;

FIG. 2c illustrates the determination of a coverage value for a pixel as known from the prior art;

FIG. 3a illustrates 32 edge vector classes represented through one sample edge vector per class as employed in the prior art;

FIG. 3b shows edge vectors belonging to one of the edge vector classes represented in FIG. 3a;

FIG. 6a depicts schematically an original edge vector belonging to a second quadrant;

FIG. 6b depicts schematically an edge vector belonging to a first quadrant which is equivalent to the original edge vector of FIG. 6a;

FIG. 6c depicts schematically a coverage mask associated to the edge vector of FIG. 6b;

FIG. 6d depicts schematically the coverage mask for the original edge vector of FIG. 6a obtained by transforming the coverage mask of FIG. 6c;

FIG. 7a depicts schematically an original edge vector belonging to a third quadrant;

FIG. 7b depicts schematically an edge vector belonging to the first quadrant which is equivalent to the original edge vector of FIG. 7a;

FIG. 7c depicts schematically a coverage mask associated to the edge vector of FIG. 7b;

FIG. 7d depicts schematically the coverage mask for the original edge vector of FIG. 7a obtained by transforming the coverage mask of FIG. 7c;

FIG. 9 is a table presenting edge vector class disambiguation rules employed in the embodiment of the method according to the invention;

FIG. 11a illustrates schematically a first possibility of distributing edge vector classes;

FIG. 11b illustrates schematically an improved possibility of distributing edge vector classes;

FIG. 12 is a listing of coverage mask ROM values;

DETAILED DESCRIPTION OF THE INVENTION

FIGS. 1 to 3 have been described above.

An embodiment of the method according to the invention will now be described with reference to FIGS. 4 to 12. The embodiment enables an antialiasing with pre-filering. More specifically, it allows to determine a coverage mask for an edge vector detected for a triangle by means of a look-up table. The edge vector is detected as in the above described prior art solutions employing a triangle rasterization with edge functions.

The presented embodiment makes use of the mathematical framework of the above cited documents "A Parallel Algorithm for Polygon Rasterization" and "A New Simple and Efficient Antialiasing with Subpixel Masks", which are both incorporated by reference herein.

For the presented embodiment, a new edge vector class clusterization in the four quadrants of the plane is defined. This new clusterization is illustrated in FIG. 4.

Figure 4:
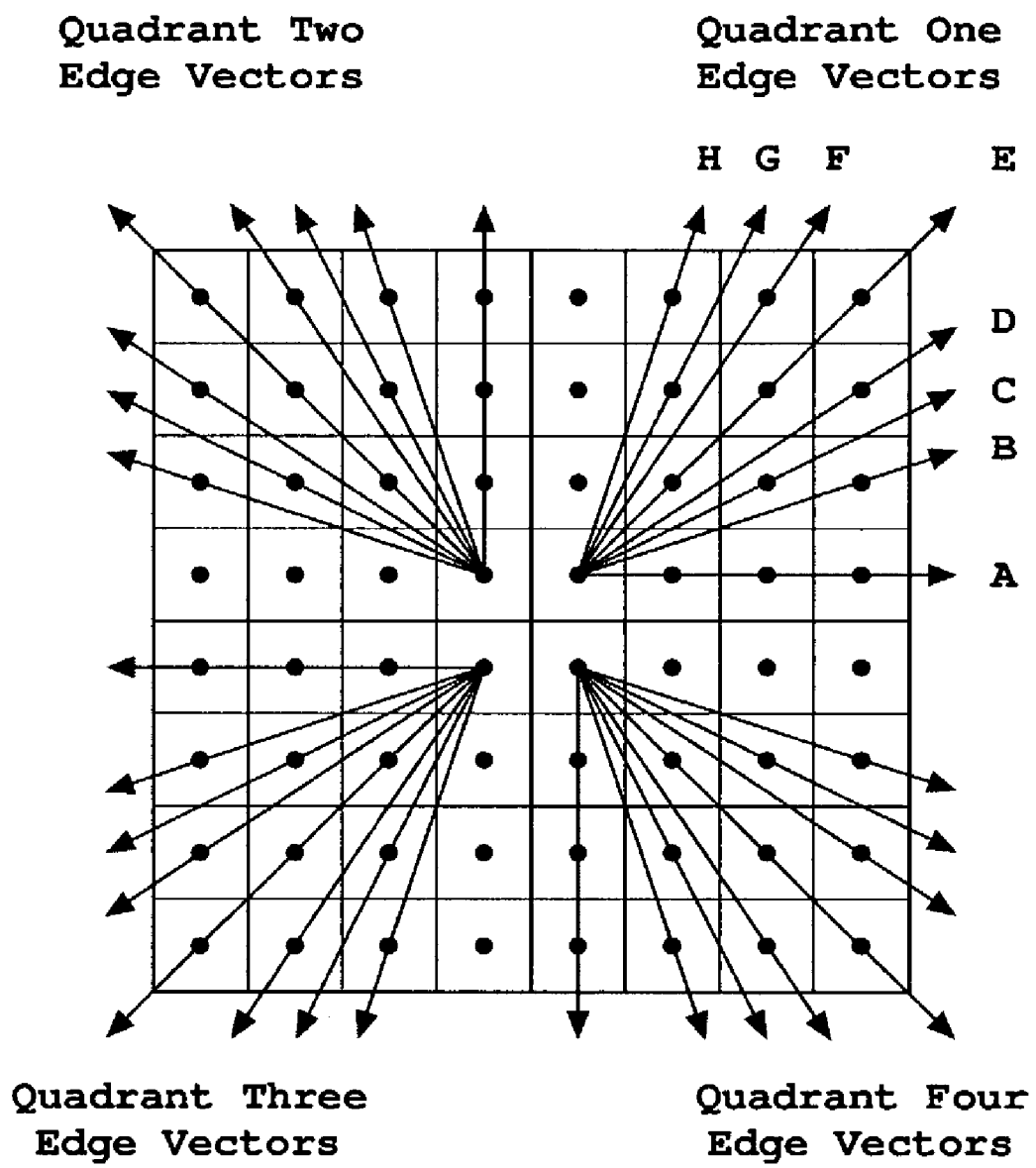
FIG. 4 is a diagram schematically illustrating an edge vector class clusterization in an embodiment of the method according to the invention.

FIG. 4 shows a first quadrant Q1, a second quadrant Q2, a third quadrant Q3 and a fourth quadrant Q4 in a plane. Each quadrant represents the same 4×4 grid of subpixels for another orientation of edge vectors. The subpixels are indicated as dotted square.

A triangle's oriented edge can be represented as a vector extending from a respective source vertex to a respective sink vertex of the triangle, as illustrated in FIGS. 1a and 1b. Given a 4×4 grid of subpixels for a pixel area, a representative edge vector may belong to one of 32 different classes, where each class is identified by its slope and its orientation.

The 32 edge vector classes are further clusterized based on their orientation, and thus according to the quadrant to which they belong.

For the horizontal/vertical edge vector classes, a convention is made. In the embodiment of FIG. 4, horizontal edge vector classes are always associated either to quadrant Q1 or to quadrant Q3, while vertical edge vector classes are always associated either to quadrant Q2 or to quadrant Q4.

For quadrant Q1, eight edge vector classes represented by a respective sample edge vector A–H are depicted in FIG. 4. Each of the sample edge vectors has its source at the center of the last subpixel of the first column of the 4×4 grid of this quadrant. The center of each of the subpixels of this grid is crossed by one of the eight sample edge vectors, except for the first three subpixels of the first column of the grid. Also for quadrant Q2, eight edge vector classes represented by a respective sample edge vector are depicted. Each of the sample edge vectors has its source at the center of the last subpixel of the last column of the 4×4 grid of this quadrant. The center of each of the subpixels of this grid is crossed by one of the eight sample edge vectors, except for the first three subpixels of the last row of the grid. Also for quadrant Q3, eight edge vector classes represented by a respective sample edge vector are depicted. Each of the sample edge vectors has its source at the center of the last subpixel of the first row of the 4×4 grid of this quadrant. The center of each of the subpixels of this grid is crossed by one of the eight sample edge vectors, except for the last three subpixels of the last column of the grid. Finally, also for quadrant Q4, eight edge vector classes represented by a respective sample edge vector are depicted. Each of the sample edge vectors has its source at the center of the first subpixel of the first row of the 4×4 grid of this quadrant. The center of each of the subpixels of this grid is crossed by one of the eight sample edge vectors, except for the last three subpixels of the first row of the grid.

As can be seen in FIG. 4, a "rotational symmetry" among the quadrants Q1–Q4 exists.

Only coverage masks for the edge vector classes in the first quadrant Q1 are stored in a coverage mask lookup table. Due to the "rotational symmetry" among the quadrants, the coverage masks for the edge vector classes in the other quadrants Q2–Q4 can be determined from the coverage masks for the first quadrant Q1.

In the following, it will be explained with reference to the flow chart of FIG. 5, how the coverage mask for a specific pixel can be determined for an arbitrary quadrant edge vector based on the stored coverage masks.

In a first step 501, parameters are computed that characterize the edge vector in connection with the pixel center M. More specifically, the parameters $d_{L1}(M)$, $de_x(\alpha)$, and $de_y(\alpha)$ are determined based on the above indicated equation (2). From the sign of the parameters $de_x(\alpha)$, and $de_y(\alpha)$, the original quadrant of the edge vector is derived.

In a second step 502, a quadrant disambiguation is performed. More specifically, the edge vector is geometrically transposed to the first quadrant Q1 by transforming the parameters that characterize this edge vector in connection with the pixel center M, i.e. $d_{L1}(M)$, $de_x(\alpha)$ and $de_y(\alpha)$.

In a third step 503, an edge vector class disambiguation is performed. More specifically, the parameters of the edge vector resulting in the second step 502 are mapped to parameters of the closest matching representative edge vector for which a coverage mask is stored in the lookup table.

In a fourth step 504, the coverage mask for the representative Q1 edge vector is fetched from the look-up table using the parameters computed in the third step 503 for the representative Q1 edge vector. The look up table contains exclusively the instances of the Q1 edge vector classes.

In a fifth step 505, a geometrical transformation of the fetched coverage mask to the original quadrant is carried out. The geometrical transformation may comprise mask rotations and bitwise negations and employs the information about the original quadrant of the original edge vector.

In a sixth step 506, the final coverage mask is obtained by correcting the coverage mask resulting in the fifth step 505 according to the orientation convention of the triangle, i.e. clockwise or counter-clockwise.

Steps 501–506 are repeated for each edge of a triangle covering the pixel. Then, a coverage value is determined by combining all final coverage masks generated for the pixel, and the resulting coverage value is used for modifying the color of the pixel for display as described above with reference to FIG. 2c.

The six steps 501–506 will be explained in more detail in the following.

Figure 5:
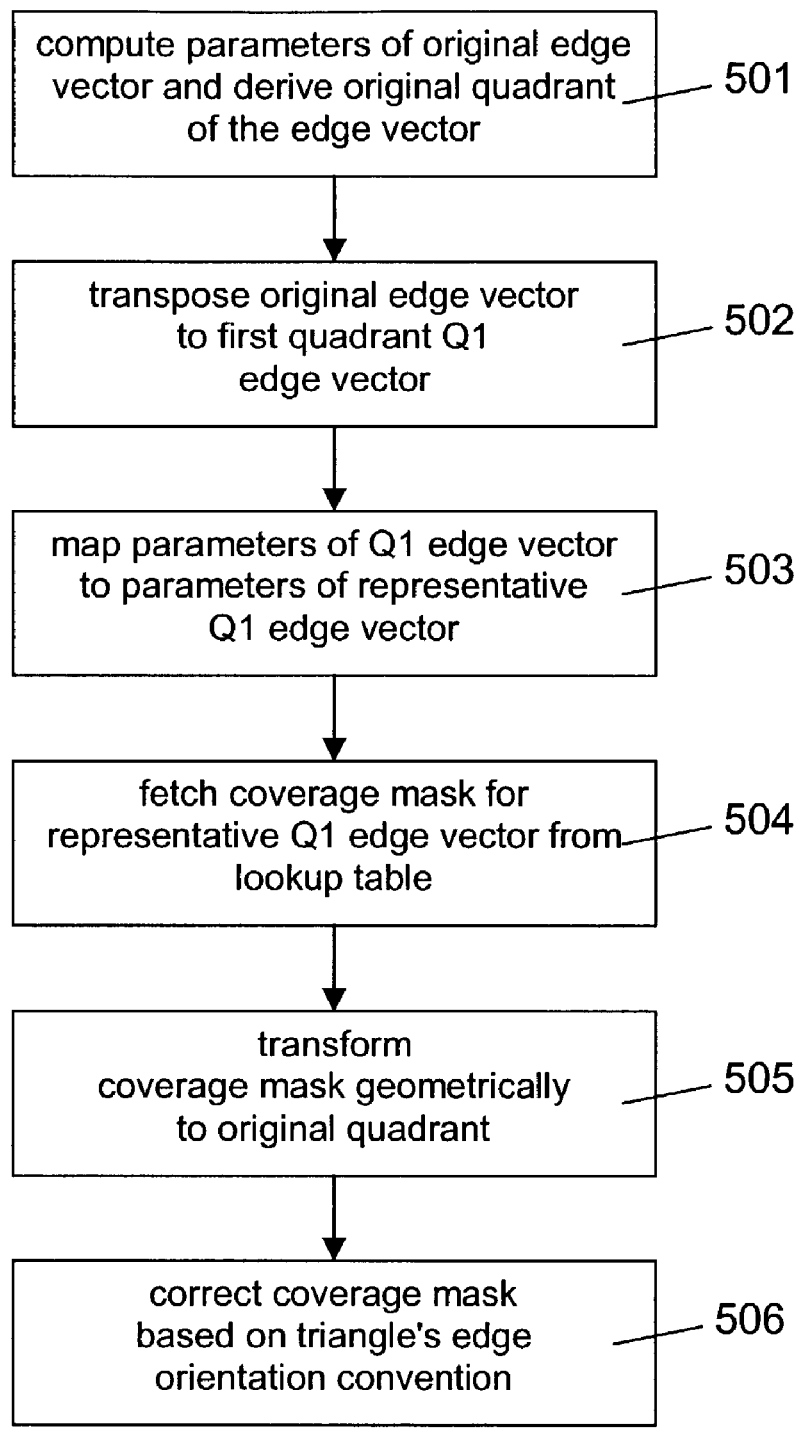
FIG. 5 is a flow chart schematically illustrating the embodiment of the method according to the invention.
Figure 6:
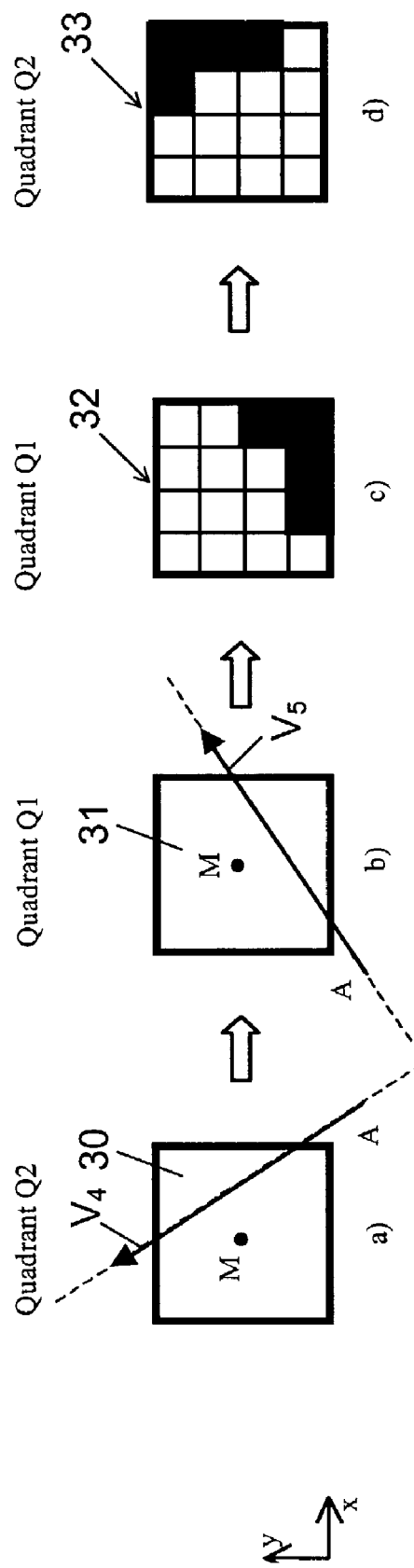
Figure 7:
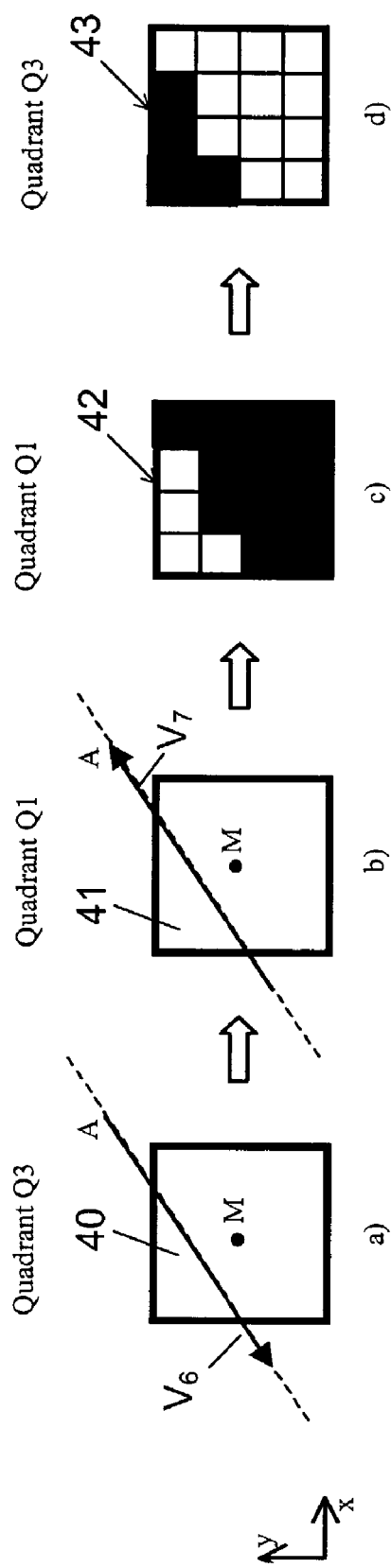

Steps 501 and 504 in the flow chart of FIG. 5 are identical with corresponding steps that are performed in the method of above cited documents "A Parallel Algorithm for Polygon Rasterization" and "A New Simple and Efficient Antialiasing with Subpixel Masks". In these prior art documents, the look up process corresponding to step 504 is performed on a much larger lookup table with increased access latency, though.

Steps 502 and 505 in the flow chart of FIG. 5 will be explained in synergy, but in a practical implementation, they can be decoupled.

Steps 502 and 505 are intended to transform an arbitrary quadrant edge vector into a Q1 edge vector, in order to require for the coverage mask retrieval in step 504 only a reduced coverage masks lookup table for representative Q1 edge vectors. After the coverage mask has been fetched from the lookup table, inverse transformations have to be operated on the coverage mask, in order to obtain the correct coverage mask for the original, arbitrary quadrant edge vector.

The forward mapping to quadrant Q1 in step 502 and the backward mapping from quadrant Q1 in step 505 are based on two important properties of the normalized edge function. The first property consists in that the normalized edge function is invariant with the origin of its defining vector along its associated line. The second property consists in that the normalized edge function is invariant with the length of its defining vector along its associated line.

In case the original edge vector belongs to the first quadrant Q1, no transformations is required in steps 502 and 505.

The transformations required for the case that the original edge vector belongs to the second quadrant Q2 are presented in FIGS. 6a–6d.

FIGS. 6a and 6b illustrate the transformation in step 502. Both figures show the area 30, 31 of a pixel and its center M. FIG. 6a further shows a Q2 edge vector $V_4$ starting at point A. The Q2 edge vector of FIG. 6a is transformed into an equivalent Q1 edge vector by a clock wise rotation by 90°. The resulting Q1 edge vector $V_5$ starting at point A is shown in FIG. 6b.

The transformation of step 502 can be expressed by the following equations:

$$\Delta y_{Q1} = -\Delta x_{Q2} \Rightarrow de_x^{Q1} = -de_y^{Q2}$$

$$\Delta x_{Q1} = \Delta y_{Q2} \Rightarrow de_y^{Q1} = de_x^{Q2}$$

$$d_{L1}^{Q1} = d_{L1}^{Q2}$$

The indices Q1 and Q2 indicate the quadrant of the edge vector to which the respective parameter belongs.

FIGS. 6c and 6d illustrate the transformation in step 505. The Q1 edge vector of FIG. 6b is used in steps 503 and 504 to fetch an associated coverage mask from the coverage mask lookup table. The fetched coverage mask is presented in FIG. 6c in form of a 4×4 grid 32 of subpixels, in which some subpixels are black, i.e. lit. This mask is rotated counter-clockwise by 90° to obtain the coverage mask for the original Q2 edge vector. The resulting coverage mask is presented in FIG. 6d in form of a 4×4 grid 33 of subpixels, in which other subpixels are lit.

The transformation of step 505 can be expressed by the following equation:

Coverage_Mask$_{Q2}$=rotate_counterclockwise_90
(Coverage_Mask$_{Q1}$)

where Coverage_Mask$_{Q2}$ represents the 16 bits of the coverage mask for the original Q2 edge vector, where Coverage_Mask$_{Q1}$ represents the 16 bits of the coverage mask for the equivalent Q1 edge vector and where the operator rotate_counterclockwise_90( ) denotes a counter-clockwise rotation by 90° of a 4×4 grid of subpixels that is encoded as a 16-bit coverage mask.

The transformations required for the case that the original edge vector belongs to the third quadrant Q3 are presented in FIGS. 7a–7d.

FIGS. 7a and 7b illustrate the transformation in step 502. Both figures show the area 40, 41 of a pixel and its center M. FIG. 7a further shows a Q3 edge vector $V_6$ starting at point A. The Q3 edge vector of FIG. 7a is transformed into an equivalent Q1 edge vector $V_7$ by flipping its orientation. The resulting Q1 edge vector $V_7$ is ending at point A is shown in FIG. 7b.

The transformation of step 502 can be expressed by the following equations:

$$\Delta x_{Q1} = -\Delta x_{Q3} \Rightarrow de_y^{Q1} = -de_y^{Q3}$$

$$\Delta y_{Q1} = -\Delta y_{Q3} \Rightarrow de_x^{Q1} = -de_x^{Q3}$$

$$d_{L1}^{Q1} = -d_{L1}^{Q3}$$

The indices Q1 and Q3 indicate the quadrant of the edge vector to which the respective parameter belongs.

FIGS. 7c and 7d illustrate the transformation in step 505. The Q1 edge vector of FIG. 7b is used in steps 503 and 504 to fetch an associated coverage mask from the coverage mask lookup table. The fetched coverage mask is presented in FIG. 7c in form of a 4×4 grid 42 of subpixels, in which some subpixels are black, i.e. lit. This mask is negated bitwise to obtain the coverage mask for the original Q3 edge vector V6. The resulting coverage mask is presented in FIG. 7d in form of a 4×4 grid 43 of subpixels, in which other subpixels are lit.

The transformation of step 505 can be expressed by the following equation:

Coverage_Mask$_{Q3}$=not(Coverage_Mask$_{Q1}$)

where Coverage_Mask$_{Q3}$ represents the 16 bits of the coverage mask for the original Q3 edge vector, where Coverage_Mask$_{Q1}$ represents the 16 bits of the coverage mask for the equivalent Q1 edge vector, and where the operator not( ) denotes a bitwise negation of the 16-bit coverage mask.

In case the original edge vector belongs to the fourth quadrant Q4, the required operations are fused computations Q4→Q2→Q1→Q2→Q4. That is, the original Q4 edge vector is first transformed into an equivalent Q2 edge vector and the resulting Q2 edge vector is then transformed into an equivalent Q1 edge vector. The coverage mask for the equivalent Q1 edge vector is first transformed into a coverage mask for the equivalent Q2 edge vector, and the coverage mask for the Q2 edge vector is then transformed into a coverage mask for the original Q4 edge vector. The transformations for the forward transition Q4→Q2 and for the backward transition Q2→Q4 are similar to the above described transformations Q3→Q1 and Q1→Q3, respectively.

The fused computations for the forward transformation in step 502 can be expressed by the following equations:

$$\Delta y_{Q1} = -\Delta x_{Q2} = \Delta x_{Q4} \Rightarrow de_x^{Q1} = de_y^{Q4}$$

$$\Delta x_{Q1} = \Delta y^{Q2} = -\Delta y_{Q4} \Rightarrow de_y^{Q1} = -de_x^{Q4}$$

$$d_{L1}^{Q1} = d_{L1}^{Q2} = -d_{L1}^{Q4}$$

The indices Q1, Q2 and Q4 indicate the quadrant of the edge vector to which the respective parameter belongs.

The fused computations for the backward transformation in step 505 can be expressed by the following equation:

Coverage_Mask$_{Q4}$ = not(Coverage_Mask$_{Q2}$)

= not(rotate_counterclockwise_90 (Coverage_Mask$_{Q1}$))

where Coverage_Mask$_{Q4}$ represents the 16 bits of the coverage mask for the original Q4 edge vector, where Coverage_Mask$_{Q2}$ represents the 16 bits of the coverage mask for the equivalent Q2 edge vector, where Coverage_Mask$_{Q1}$ represents the 16 bits of the coverage mask for the equivalent Q1 edge vector, where the operator not( ) denotes a bitwise negation of the 16-bit coverage mask, and where the operator rotate_counterclockwise_90( ) denotes a counter-clockwise rotation by with 90° of a 4×4 grid of subpixels that is encoded as a 16-bit coverage mask.

Due to the fact that the coverage masks lookup table contains only entries for the Q1 edge vector classes, the indexing scheme for the lookup table becomes simpler compared to the prior art solutions. The index can be composed taking into account only the transformed parameters $d_{L1}^{Q1}(M)$ and $de_x^{Q1}(\alpha)$. The Q1 edge vector classes can be distinguished from each other by the $de_x^{Q1}(\alpha)$ value only. The range for the parameter $de_x^{Q1}(\alpha)$ is $de_x^{Q1}(\alpha) \in [0, +1)$. The vertical edge vector class found at the intersection between the first quadrant Q1 and the second quadrant Q2 belongs according to the convention mentioned with reference to FIG. 4 to the second quadrant Q2. The coverage masks lookup table, which contains only coverage masks for the Q1 edge vector classes, will also be referred to as coverage masks ROM (read only memory).

Figure 10:
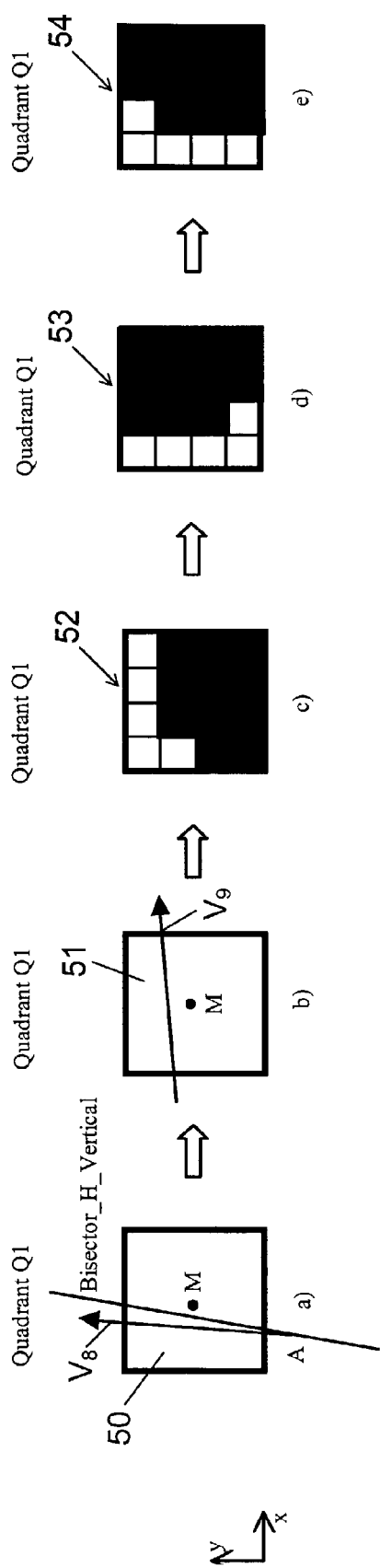
FIG. 10a depicts schematically an edge vector belonging to the first quadrant.
FIG. 10b depicts schematically an edge vector belonging to the first quadrant which is equivalent to the edge vector of FIG. 10a and which is obtained by wrap around.
FIG. 10c depicts schematically a coverage mask associated to the edge vector of FIG. 10b.
FIG. 10d depicts schematically the coverage mask of FIG. 10c after a rotation by 90°.
FIG. 10e depicts schematically the coverage mask for the edge vector of FIG. 10a, the coverage mask being obtained by a vertical flipping transformation applied to the coverage mask of FIG. 10d.

Step 503 in the flow chart of FIG. 5, which is responsible for the edge vector class disambiguation, will now be explained with reference to FIGS. 8 to 10.

As briefly mentioned above, it is the task of the edge vector class disambiguation step 503 to map the parameters of the Q1 edge vector resulting in step 502 into parameters of the closest matching representative edge vector whose coverage mask is resident in the lookup table.

The Q1 edge vector resulting in step 502 can have any slope, while coverage masks are only stored for edge vector classes having one of eight discrete slopes. The Q1 edge vector thus has to be classified in one of the eight Q1 edge vector classes for which coverage masks are stored in the coverage masks ROM. Conceptually, the disambiguation process of the edge vector class is reduced to the problem of finding the boundaries between neighboring quadrant one edge vector classes for which masks are stored in the coverage masks ROM.

Figure 8:
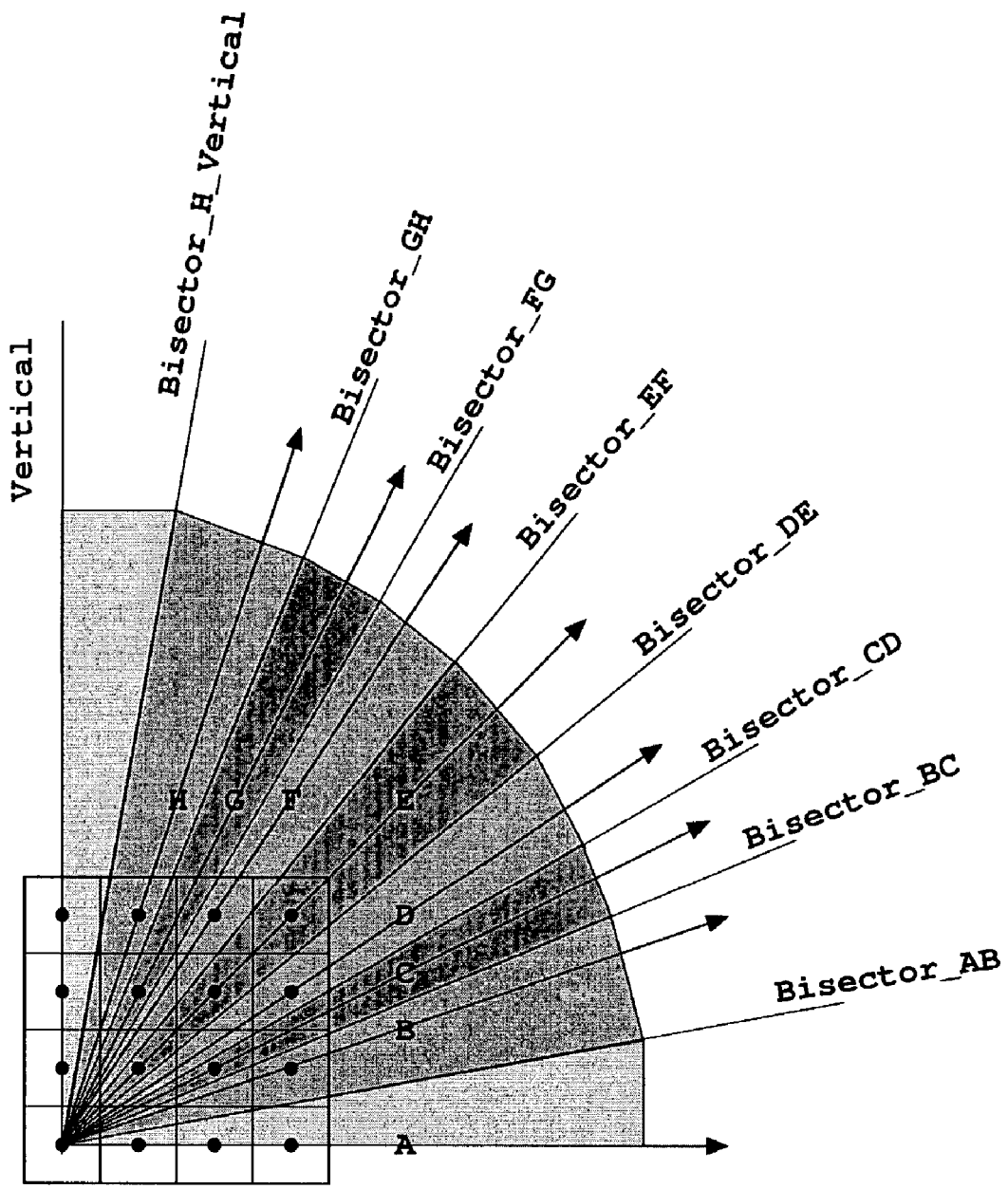
FIG. 8 illustrates schematically an edge vector class disambiguation performed in the embodiment of the method according to the invention.

FIG. 8 is a diagram presenting the edge vector classes of the first quadrant Q1 represented by edge vectors A–H, and in addition eight bisectors Bisector_AB, Bisector_BC, ..., Bisector_GH, Bisector_H_Vertical. Each bisector is represented by a line starting at the source of the edge vectors A–H and extending between two adjacent ones of the edge vectors A–H. The index of the bisectors denotes the two representative edge vectors A–H between which the associated line extends. Only the line of the last bisector Bisector_H_Vertical extends between the last edge vector H and a vertical line. To each bisector, a value of the parameter $de_x^{Q1}(\alpha)$ is associated in accordance with the slope of its line. These values can equally be determined in accordance with above indicated equations (2).

An incoming Q1 edge vector can now be classified to one of the Q1 edge vector classes based on its own $de_x^{Q1}(\alpha)$ value, the bisector lines representing the limits for the association to a specific Q1 edge vector class. For example, if the $de_x^{Q1}(\alpha)$ value of an incoming Q1 edge vector lies between the $de_x^{Q1}(\alpha)$ values of bisectors Bisector_AB and Bisector_BC, then the incoming Q1 edge vector is classified to edge vector class B and the $de_x^{Q1}(\alpha)$ value of the incoming Q1 edge vector is substituted by the $de_x^{Q1}(\alpha)$ value of the edge vector class B.

Since only eight edge vector classes A–H are represented in the coverage masks ROM, only three bits are needed to encode their $de_x^{Q1}(\alpha)$ value in the coverage masks ROM index. This 3-bit code is produced directly as a result of the edge vector class disambiguation with bisectors. In the coverage masks ROM, 256 coverage masks are stored. As in prior art, thus five bits remain available in the ROM index to encode 32 $L_1$-norm distances $d_{L1}(M)$. That is, coverage masks for 32 different values of the distance $d_{L1}(M)$ from the pixel center M to a particular edge slope can be stored for each edge vector class.

The rules for the edge vector class disambiguation with bisectors are presented in FIG. 9.

FIG. 9 is a table which presents in a first column ranges for the $de_x^{Q1}(\alpha)$ values of incoming Q1 edge vectors. The first range extends from 0 to the $de_x^{Q1}(\alpha)$ value of the first bisector Bisector_AB. The following seven ranges extend respectively from the $de_x^{Q1}(\alpha)$ value of one bisector to the $de_x^{Q1}(\alpha)$ value of the next bisector. A last range extends from the last bisector Bisector_H_vertical to +1.

A second column of the table of FIG. 9 presents the disambiguated $de_x^{Q1}(\alpha)$ values associated to a respective range in the first column, i.e. the $de_x^{Q1}(\alpha)$ value of a respective representative edge vector class $de_x^A$ to $de_x^H$. These disambiguated $de_x^{Q1}(\alpha)$ values represent constants, which may be programmed in hardware. Thus, no computational effort is required at the rasterization time to compute them.

A third column of the table of FIG. 9 with the heading "$de_x^{ROM\_index\_code}$" presents the 3-bit code required to encode the disambiguated $de_x^{Q1}(\alpha)$ value in the coverage masks ROM index. The code represents from top to bottom values from "000" to "111", and the value in the last row is "000" again.

A fourth column of the table of FIG. 9 with the heading "wrap_around_flag" is required for handling an exceptional case in a specific way, as will be explained in the following.

Referring to FIG. 8, an exceptional case appears for the disambiguation of any incoming Q1 edge vector whose slope lies between Bisector_H_Vertical and the vertical. Normally, such an edge vector would have to be disambiguated to a vertical edge vector class, but according to the convention presented in FIG. 4, this edge vector class belongs to the second quadrant Q2, not to the first quadrant Q1.

Therefore, such exceptional edge vectors are disambiguated by wrapping around to the edge vector class A as presented in the last row in the table of FIG. 9. Further, a binary condition signal wrap_around_flag is set according to the fourth column of the table of FIG. 9. This flag is not set in any other case.

The determined ROM index can then be used in step 504 to fetch the associated coverage mask from the lookup table.

When the coverage mask has been fetched from the lookup table in step 504, a correction to the fetched coverage mask has to be performed before proceeding with step 505, in case the condition signal wrap_around_flag was set in step 503.

This coverage mask correction process is presented in FIGS. 10a–10e.

FIGS. 10a and 10b both show the area 50, 51 of a pixel and its center M. FIG. 10a further presents an original Q1 edge vector $V_8$ having a slope in the range between the last bisector line Bisector_H_Vertical and the vertical. FIG. 10b shows an equivalent Q1 edge vector $V_9$ belonging to edge vector class A, which is obtained by wrap around.

The equivalent Q1 edge vector $V_9$ is used to fetch an associated coverage mask from the lookup table. This coverage mask is presented in FIG. 10c in form of a 4×4 grid 52 of subpixels, in which some subpixels are black, i.e. lit. The fetched coverage mask is rotated counter-clockwise by 90°. The resulting coverage mask is presented in FIG. 10d in form of a 4×4 grid 53 of subpixels, in which some other subpixels are lit. The corrected coverage mask for the original Q1 edge vector $V_8$ is then obtained by a final vertical flipping transformation. The corrected coverage mask is presented in FIG. 10e in form of a 4×4 grid 54 of subpixels, in which still other subpixels are lit.

The correction process can be expressed by the following equation:

$$\text{Adjusted\_Mask}_{Q1} = \text{flip\_vertically}(\text{rotate\_counterclockwise\_90}(\text{Coverage\_Mask}_{Q1}))$$

where Adjusted_Mask$_{Q1}$ represents the 16 bits of the desired corrected coverage mask, where Coverage_Mask$_{Q1}$ represents the 16 bits of the fetched coverage mask, where the operator rotate_counterclockwise_90( ) denotes a counter-clockwise rotation by 90° of a 4×4 grid of subpixels that is encoded as a 16-bit coverage mask, and where the operator flip_vertically( ) denotes a vertical mirroring of a 4×4 grid of subpixels that is encoded as a 16-bit coverage mask. The mirroring of the mask was chosen in order to ensure that the coverage mask is resembling geometrically the pixel area covered by the edge of the triangle.

Step 506 in the flow chart of FIG. 5, finally, is implemented to ensure that the described coverage mask lookup scheme can be employed to work with triangles with edges oriented clockwise or counter-clockwise, as required for OpenGL or Microsoft's DirectX-Direct3D® compliance.

The coverage masks in the coverage masks ROM are computed only for a clockwise orientation of the triangle's edge vectors. For triangles with edges oriented counter-clockwise, the coverage mask obtained through the operations described so far has to be bitwise negated with the operator not( ) to deliver the final coverage mask. The orientation of the triangle's edges can be detected by computing the sign of the edge function $E_{AB}(x_C,y_C)$ presented above as equation (1), or equivalently, by computing the normalized edge function $d_{L1}^{AB}(C)$, the indices A and B representing in both cases a source vertex A and a sink vertex B of an edge vector for the triangle. Alternatively, any other cyclic permutation of triangle's vertices A, B, C could be used. If the computed edge function values are positive, the edges of the triangle are oriented clockwise, if they are negative the edges are oriented counter-clockwise. In case they are equal to zero, the triangle is degenerate and it is not rasterized at all. Such computations are required anyhow for the triangle interpolation setup, i.e., $\delta z/\delta x$, $\delta z/\delta y$ etc.

For summarizing the described steps 501 to 506, a complete hardware algorithm for fetching the coverage mask for an edge vector that presents a partial coverage over the current rasterization position, i.e. over the current pixel, is presented:

1. Compute $de_x$ and $de_y$ for the edge vector and from the signs of $de_x$ and $de_y$ determine the initial quadrant for the edge vector. This is performed only once per edge.

2. Compute $d_{L1}$ for the current rasterization position that the edge touches.

3. For quadrant disambiguation, perform the next operations if the initial quadrant for the edge vector is the following:

Q1: $de_x^{Q1}=de_x$ and $d_{L1}^{ROM\_index}=d_{L1}$
Q2: $de_x^{Q1}=-de_y$ and $d_{L1}^{ROM\_index}=d_{L1}$
Q3: $de_x^{Q1}=-de_x$ and $d_{L1}^{ROM\_index}=-d_{L1}$
Q4: $de_x^{Q1}=de_y$ and $d_{L1}^{ROM\_index}=-d_{L1}$ 4. For the edge vector class disambiguation, disambiguate the value for $de_x^{Q1}$ according to the table of FIG. 9, thus producing a 3-bit $de_x^{ROM\_index\_code}$ value. If this disambiguation has produced a wrap-around set wrap_around_flag, else unset wrap_around_flag.

5. Use the 3-bit $de_x^{ROM\_index\_code}$ value and the 5 most significant bits of $d_{L1}^{ROM\_index}$ to compose an address, and fetch the coverage mask MASK from the coverage masks ROM based on the composed address.

6. If necessary, adjust the coverage mask MASK by producing an intermediary coverage mask MASK_ADJUSTED, i.e.:
If the wrap_around_flag was set then perform
MASK_ADJUSTED=flip_vertically
  (rotate_counterclockwise_90(MASK))
Else perform
MASK_ADJUSTED=MASK 7. If the initial quadrant for the edge vector was the following then compute another intermediary coverage mask COVERAGE_MASK:

Q1:
COVERAGE_MASK=MASK_ADJUSTED

Q2:
COVERAGE_MASK=rotate_counterclockwise_90
  (MASK_ADJUSTED)

Q3:
COVERAGE_MASK=not(MASK_ADJUSTED)

Q4:
COVERAGE_MASK=not(rotate_counterclockwise_90
  (MASK_ADJUSTED))

8. Compute the final coverage mask for the edge vector by testing the orientation of the triangle's edges.

If triangle's edges are oriented clockwise ($d_{L1}^{AB}(C)>0$ or $E_{AB}(x_C,y_C)>0$) perform:
FINAL_COVERAGE_MASK=COVERAGE_MASK Else perform:
FINAL_COVERAGE_MASK=not(COVERAGE_MASK)

The accuracy achieved with the presented embodiment can be further increased by adjusting the distribution of the eight edge vector classes in the Q1 space.

The initial distribution of the eight edge vector classes in the Q1 space has a tremendous impact on the coverage masks ROM content and affects also the precision of the antialiasing process performed on the fly during rasterization. If the eight edge vector classes from the first quadrant Q1 are selected to pass through the subpixel centers of the pixel, the edge vector classes are not uniformly spread in the angular space of the first quadrant Q1 and also the error distribution will not be uniform in the quadrant. This distribution was used for the representation of the edge vector classes in FIGS. 4 and 8, in correspondence with the prior art described with reference to FIGS. 3a and 3b. This distribution is shown again for reasons of comparison in FIG. 11a. FIG. 11a presents a 4×4 grid 60 of subpixels depicted as dotted squares. Further, eight edge vectors A–H representing a respective edge vector class are shown. Each of the edge vectors passes through the center of at least one of the subpixels. It can be seen that this distribution is non-uniform with regard to the achieved vector slopes.

A series of experiments showed that a larger increase in accuracy is obtained by spreading the eight edge vector classes uniformly in the $de_x^{Q1}$ ($\alpha$) space. Such a uniform distribution is presented in FIG. 11b. FIG. 11b shows again a 4×4 grid 61 of subpixels depicted as dotted squares. Further, eight edge vectors A–H representing a respective edge vector class are shown. Here, however, the edge vectors do not necessarily pass through the center of one of the subpixels. Rather, the difference in the slope from one vector to the next is approximately the same, and thus the distribution is almost uniform.

Such a uniform distribution provides a two-fold benefit. On the one hand, the errors of the antialiasing scheme during the edge vector class disambiguation are distributed more evenly among the representative edge vectors. On the other hand, the area absolute error upper bound is reduced from 15.25% manifested by the prior art to 8.34% for the present scheme.

For a setup with eight edge vector classes uniformly spread in the $de_x^{Q1}(\alpha)$ space of the first quadrant Q1, the $de_x^{Q1}(\alpha)$ values of the bisectors presented in the first column of the table of FIG. 9 are:

$de_x^{Bisector\_AB}=0.0663522979$;
$de_x^{Bisector\_BC}=0.1909830036$;
$de_x^{Bisector\_CD}=0.3150379610$;
$de_x^{Bisector\_DE}=0.4384471872$;
$de_x^{Bisector\_EF}=0.5615528130$;
$de_x^{Bisector\_FG}=0.6849620384$;
$de_x^{Bisector\_GH}=0.8090169944$;
$de_x^{Bisector\_H\_Vertical}=0.9336477008$.

Further, a possible coverage masks ROM content for this setup will be presented. The coverage mask encoding, i.e. the association of 16 bits to a 4×4 grid of subpixel, was illustrated in FIG. 2a. There are several ways of associating 8-bit index values [0] to [255] to a coverage mask, one of which will be presented. If the index in the coverage masks ROM is represented as an 8-bit string, the first 3 msb represent the code for the edge vector class as presented in the table of FIG. 9. The other 5 bits represent the 5 lsb (least significant bits) of the $d_{L1}^{ROM\_index}$ value, with $d_{L1}^{ROM\_index} \in [-0.5,+0.5)$. The $d_{L1}^{ROM\_index}$ value is coded as a two's complement signed number which is shifted left by 5 positions. Thus a $d_{L1}^{ROM\_index}$ value of $-16/32$ is coded in the 5 lsb of the index as "10000", a $d_{L1}^{ROM\_index}$ value of $-15/32$ is coded as "10001", and a $d_{L1}^{ROM\_index}$ value of $+15/32$ is coded as "01111".

A coverage masks ROM associating such 8-bit index values to 16-bit coverage masks is presented in FIGS. 12a–12d. FIGS. 12a–12d represent a single list distributed over four pages.

The quality of the achieved antialiasing could be increased without making modifications to the proposed method, by taking into account more quadrant Q1 edge vector classes or more accurate coverage masks (5×5, 6×6, etc.), or both.

The presented method can be implemented in various devices and systems.

Figure 13:
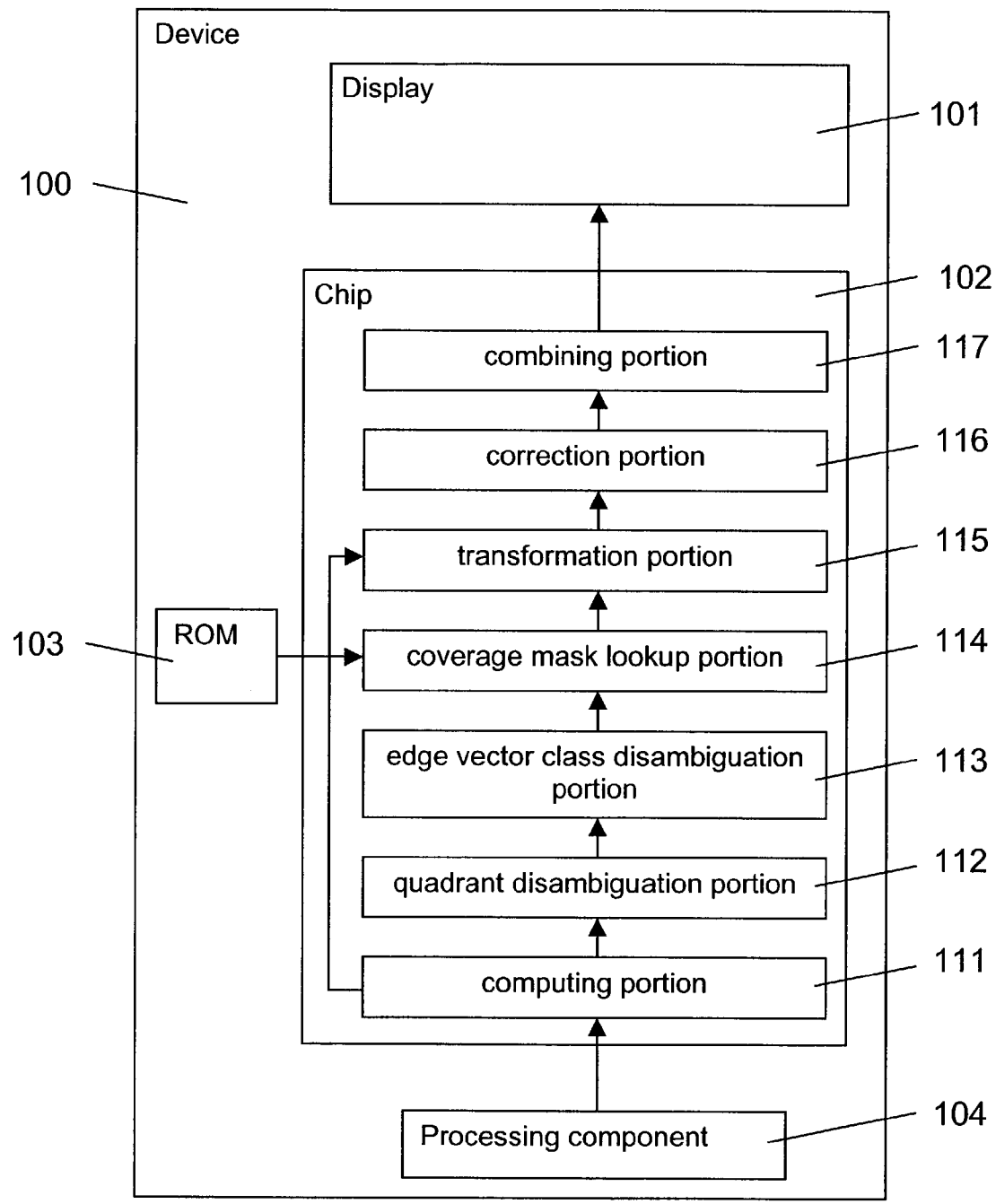
FIG. 13 is a block diagram of a device in which the embodiment of the method according to the invention is implemented.

FIG. 13 is a schematic block diagram of a device 100 in which the presented method is implemented by way of example. The device 100 can be for instance a computer or a mobile terminal. The device 100 comprises among other components a display 101, a chip 102, a ROM 103 and a processing component 104. The presented method is implemented actually in the chip 102 as a hardware algorithm. The chip 102 comprises to this end connected in series to each other a computing portion 111 for carrying out step 501, a quadrant disambiguation portion 112 for carrying out step 502, an edge vector class disambiguation portion 113 for carrying out step 503, a coverage mask lookup portion 114 for carrying out step 504, a transformation portion 115 for carrying out step 505 and a correction portion 116 for carrying out step 506 in the flow chart of FIG. 5. Further, the chip 102 comprises a combining portion 117 for combining for each pixel the coverage masks determined for all edges of a triangle covering the respective pixel, for determining based on the combined coverage masks a respective coverage value and for modifying the color of the pixel accordingly.

The computing portion 111 receives the graphical data on a respective triangle that is to be displayed on the display 101 by the processing component 104. The coverage mask lookup portion 114 has access to the ROM 103, which stores the coverage masks lookup table. The coverage masks lookup table content has to account only for a quarter of the number of the edge vector classes required in the prior art. The modified color for each pixel is provided by the combining portion 117 to the display 101 component for display.

The forward and backward transformations according to steps 502 and 505 carried out by the quadrant disambiguation portion 112 and the transformation portion 115, respectively, ensure by construction that two adjacent triangles, both front-facing or both back-facing, always complement each other, and that a total coverage of more than 4×4 subpixels is impossible. There is no need for additional redundancy to be built in the coverage masks lookup table for this purpose as was the case for prior art.

The sign complementation unary operator employed by the quadrant disambiguation portion 112, which depends on the underlying data representation, may be realized with little additional cost. A first approach consists in toggling only the sign bit, if the signed magnitude number representation is employed. A second approach consists in negating the operand bitwise and then adding a 'one' in the ulp (unit in least significant position) position, if the two's complement number representation is employed. The computation may also be masked in computations required elsewhere or be computed once and reused many times. This is a typical case for $de_x(\alpha)$ and $de_y(\alpha)$ sign complementation computed once during a triangle setup stage and then reused for all the fragments that lie on the edge vector boundary.

The coverage mask rotation operator rotate_counterclockwise_90( ) employed by the transformation portion 115 can be realized simply by the proper routing of signals representing the bits in the coverage mask.

The bitwise negation operator not( ) employed by the transformation portion 115 requires an inverter per bit of the coverage mask. This may be unnecessary, if a logic family with differential logic inputs/outputs, e.g. DCVSL (Differential Cascade Voltage Switched Logic), is employed.

The edge vector class disambiguation portion 113 may comprise a fast logic circuit with logarithmic depth, which implements a sorting tree for edge vector class disambiguation with the outputs presented in columns three and four of the table of FIG. 9. Moreover, the sorting tree can be evaluated once during a triangle setup stage, and then the result can be reused for all the fragments that lie on the edge vector boundary.

The correction of the fetched coverage mask, in case the condition signal wrap_around_flag was asserted, has to be introduced between step 504 and step 505, and may be implemented in an additional portion between the coverage mask lookup portion 114 and the transformation portion 115, or alternatively in one of these two portions 114, 115. The correction may imply for instance the hardware costs of one additional 2:1 MUX (multiplexer) controlled by the signal wrap_around_flag. Alternatively, no cost at all are necessary for the rotation and the mirroring required for the correction of the coverage mask, because these operations can be fused together to be implemented only by the proper routing of the hardware signals representing the bits in the coverage mask.

The hardware of the correction portion 116 may comprise a 2:1 MUX and an inverter per bit of the coverage mask. The same hardware considerations apply to the bitwise negation in this portion 116 as explained for the transformation portion 115.

It is to be noted that the depicted processing portions of the chip do not have to be separate portions. For example, specific processing steps may be carried out by a single part of a circuit for several portions. Further, the depicted portions do not have to be connected directly to each other, as there may be other portions performing additional processing steps which are arranged between them.

Figure 14:
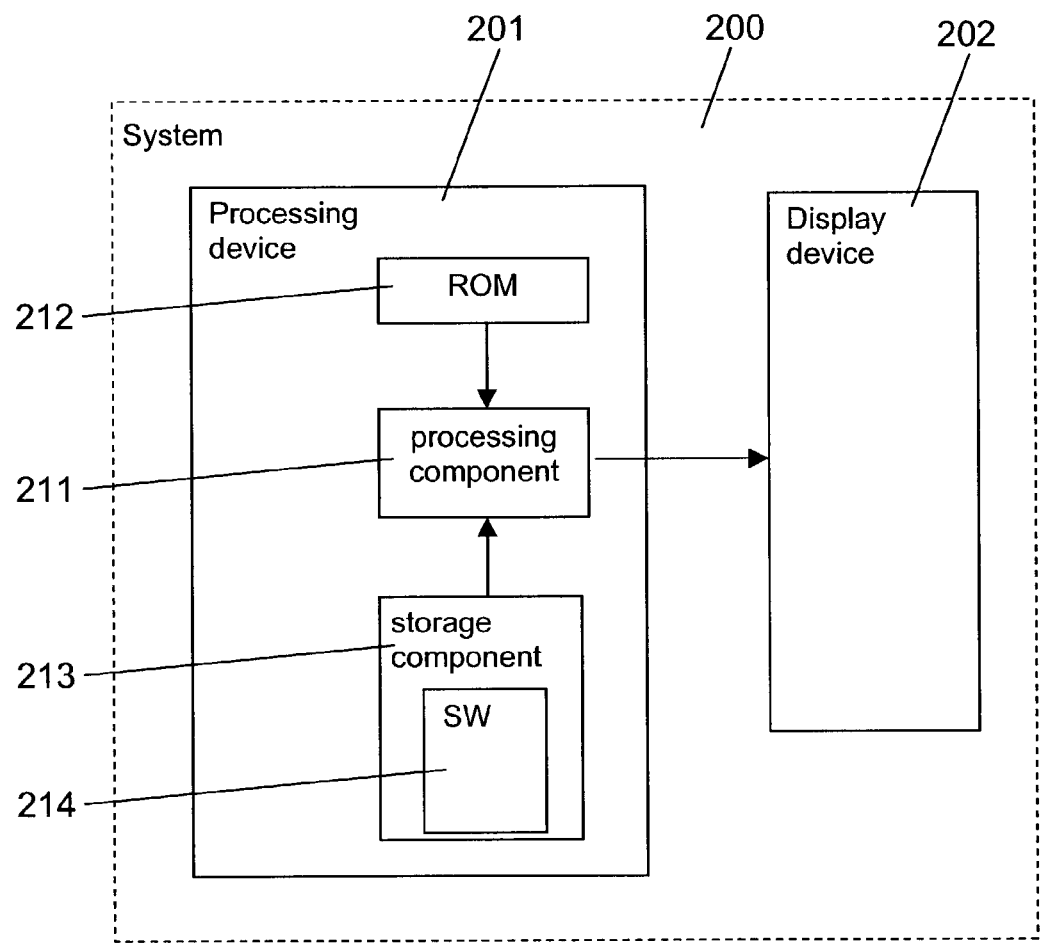
FIG. 14 is a block diagram of graphic presentation system in which the embodiment of the method according to the invention is implemented.

FIG. 14 is a schematic block diagram of a graphic presentation system 200 in which the method is implemented by way of example. The system 200 comprises a processing device 201 and a display device 202, which are connected to each other. The processing device 201 can be for instance a computer and the display device 202 can be for instance a monitor connected to the computer. The processing device 201 comprises among other components a signal processing component 211, a ROM 212 for storing a coverage masks lookup table and a storage component 213 for storing a software code that can be executed by the processing component 211. The software codes stored in the storage component 213 comprise a software algorithm 214 implementing the presented method. When this software algorithm 214 is loaded into the processing component 211 and executed, available graphic data on a triangle that is to be displayed is processed according to steps 501 to 506 in the flow chart of FIG. 5. In addition, the software algorithm takes care of combining for each pixel the coverage masks determined for all edges of a triangle covering the respective pixel, of determining a respective coverage value based on the combined coverage masks, and of modifying the color of the pixel accordingly. The determined color of the pixels is then provided to the display device 202 for display of the triangle. For fetching a coverage mask from a lookup table in step 504, the processing component accesses the ROM 212.

It is to be understood that the invention could also be implemented in a device by software or in a system by hardware. In case of a hardware implementation, the hardware is further not necessarily integrated in a chip.

While there have shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining for a pixel a coverage mask reflecting an orientation of an original edge vector, which pixel is to be employed for displaying at least a part of a geometric primitive on a display, wherein said original edge vector represents an oriented edge of said geometric primitive, said method comprising:
   a) determining one of four quadrants of a Cartesian coordinate system to which said original edge vector belongs due to its orientation;
   b) transposing said original edge vector into a predetermined one of said four quadrants;
   c) fetching a stored coverage mask which is associated at least indirectly to said transposed edge vector;
   d) transforming said fetched coverage mask to said quadrant to which said original edge vector belongs; and
   defining representative edge vectors having different, predetermined orientations, said representative edge vectors being distributed by said predetermined orientations in a rotationally symmetric manner to said four quadrants of said Cartesian coordinate system, such that if the set of representative edge vectors defined for one quadrant is rotated in steps of 90°, the resulting edge vectors correspond exactly to the set of representative edge vectors defined for another quadrant, said method further comprising after step b) selecting one of said representative edge vectors in said predetermined quadrant, which representative edge vector has a similar orientation as said transposed edge vector, wherein step c) comprises fetching a stored coverage mask which is associated to said selected representative edge vector and thereby indirectly to said transposed edge vector; and
   wherein a first representative edge vector of said predetermined quadrant lies on a first border to a first neighboring quadrant of said predetermined quadrant, wherein a representative edge vector lying on a second border to a second neighboring quadrant of said predetermined quadrant constitutes a first representative edge vector of said second neighboring quadrant, wherein in case said transposed edge vector has a similar orientation as said first representative edge vector of said second neighboring quadrant, said method comprises as an exceptional additional step after step b) selecting said first representative edge vectors of said predetermined quadrant as representative edge vector, wherein step c) comprises fetching a stored coverage mask which is associated to said selected representative edge vector, and as an exceptional additional step after step c) correcting said fetched coverage mask.

2. A method according to claim 1, further comprising determining a distance between said original edge vector and a center of said pixel, wherein each stored coverage mask is associated to a combination of an edge vector of a specific orientation and of a specific distance to the center of a respective pixel, and wherein in step c) a stored coverage mask is fetched which is associated at least indirectly to said transposed edge vector and to said distance determined for said original edge vector.

3. A method according to claim 2, wherein an original edge vector is defined by parameters characterizing said original edge vector, a first parameter $d_{L1}(M)$ identifying the distance of said edge vector from a center M of said pixel, a second parameter $de_x(\alpha)$ representing the distance in x-direction between a source point of said edge vector and a sink point of said edge vector, and a third parameter $de_y(\alpha)$ representing the distance in y-direction between said source point of said edge vector and said sink point of said edge vector, wherein said quadrant to which said original edge vector belongs is determined based on the signs of said second and said third parameter and wherein said original edge vector is transposed to said predetermined quadrant by adapting the values of said first parameter and of one of said second and said third parameter.

4. A method according to claim 3, wherein said predetermined quadrant is the first quadrant of said Cartesian coordinate system, and wherein transposing an original edge vector into said first quadrant is performed,
   in case an original edge vector belongs to said first quadrant, by keeping the original values of said first parameter $d_{L1}(M)$ and of said second parameter $de_x(\alpha)$;
   in case an original edge vector belongs to said second quadrant, by assigning to said second parameter $de_x(\alpha)$ the inverted original value of said third parameter $de_y(\alpha)$ and by keeping the original value of said first parameter $d_{L1}(M)$;
   in case an original edge vector belongs to said third quadrant, by assigning to said first parameter $de_x(\alpha)$ the inverted original value of said first parameter $de_x(\alpha)$ and by assigning to said first parameter $d_{L1}(M)$ the inverted original value of said first parameter $d_{L1}(M)$;
   in case an original edge vector belongs to said fourth quadrant, by assigning to said first parameter $de_x(\alpha)$ the original value of said second parameter $de_x(\alpha)$ and by assigning to said first parameter $d_{L1}(M)$ the inverted original value of said first parameter $d_{L1}(M)$.

5. A method according to claim 1, wherein said predetermined quadrant is the first quadrant of said Cartesian coordinate system, wherein each stored coverage mask comprises a sequence of bits representing values for subpixels of a grid of subpixels covering an area which is represented by said pixel on a display, and wherein transforming said fetched coverage mask to said quadrant to which said original edge vector belongs is performed, in case an original edge vector belongs to said first quadrant, by keeping said fetched coverage mask;

in case an original edge vector belongs to said second quadrant, by rotating said fetched coverage mask counterclockwise by 90°;

in case an original edge vector belongs to said third quadrant, by negating bitwise each bit of said fetched coverage mask;

in case an original edge vector belongs to said fourth quadrant, by rotating said fetched coverage mask counterclockwise by 90° and by negating bitwise each bit of said rotated coverage mask.

6. A method according to claim 1, further comprising determining a coverage mask for each edge of said geometric primitive and combining said transformed coverage masks to a single coverage mask for said pixel, said combined coverage mask representing the extend of coverage of said pixel by said geometric primitive.

7. The method according to claim 1
wherein said predetermined orientations for said representative edge vectors are selected such that said representative edge vectors are distributed uniformly over an angle-related space to said four quadrants.

8. A method according to claim 1, wherein the orientation of the edges of said geometric primitive is selected to be one of clockwise and counter-clockwise, wherein dedicated coverage masks are stored only for one of said clockwise and said counter-clockwise orientation, and wherein a fetched coverage mask is corrected in case a geometric primitive has an orientation for which no dedicated coverage masks are stored.

9. A device determining for a pixel a coverage mask reflecting an orientation of an original edge vector, which pixel is to be employed for displaying at least a part of a geometric primitive on a display, wherein said original edge vector represents an oriented edge of said geometric primitive, said device comprising:

a computing portion for determining one of four quadrants of a Cartesian coordinate system to which an original edge vector belongs due to its orientation;

a quadrant disambiguation portion for transposing an original edge vector into a predetermined one of said four quadrants;

a coverage mask look-up portion for fetching a stored coverage mask, which coverage mask is associated at least indirectly to a transposed edge vector provided by said transposing portion;

a transformation portion for transforming a coverage mask provided by said coverage mask look-up portion to a quadrant determined by said computing portion;

means for defining representative edge vectors having different, predetermined orientations, said representative edge vectors being distributed by said predetermined orientations in a rotationally symmetric manner to said four quadrants of said Cartesian coordinate system, such that if the set of representative edge vectors defined for one quadrant is rotated in steps of 90°, the resulting edge vectors correspond exactly to the set of representative edge vectors defined for another quadrant; and means for selecting one of said representative edge vectors in said predetermined quadrant, which representative edge vector has a similar orientation as said transposed edge vector;

wherein the coverage mask look-up portion for fetching a stored coverage mask fetches a stored coverage mask which is associated to said selected representative edge vector and thereby indirectly to said transposed edge vector;

wherein a first representative edge vector of said predetermined quadrant lies on a first border to a first neighboring quadrant of said predetermined quadrant;

wherein a representative edge vector lying on a second border to a second neighboring quadrant of said predetermined quadrant constitutes a first representative edge vector of said second neighboring quadrant;

wherein in case said transposed edge vector has a similar orientation as said first representative edge vector of said second neighboring quadrant, said device further comprises means for selecting said first representative edge vectors of said predetermined quadrant as representative edge vector;

wherein the coverage mask look-up portion for fetching a stored coverage mask, fetches a stored coverage mask which is associated to said selected representative edge vector; and wherein said device further comprises means for correcting said fetched coverage mask.

10. A device according to claim 9, further comprising a storage unit for storing a plurality of coverage masks, said coverage mask look-up portion having access to said storage unit for fetching a coverage mask, which coverage mask is associated at least indirectly to a transposed edge vector provided by said transposing portion.

11. A device according to claim 9, further comprising a combining portion for combining a plurality of transformed coverage masks provided by said transformation portion for a specific pixel and for modifying a color of said pixel for display based on said combined coverage mask.

12. A device according to claim 11, further comprising a display for displaying pixels of which a color was modified by said combining unit.

13. A device according to claim 9, wherein said device is a mobile terminal.

14. A device according to claim 9, wherein said device is a computer.

15. A device according to claim 9, wherein said device is a chip.

16. A graphic presentation system determining for a pixel a coverage mask reflecting an orientation of an original edge vector, which pixel is to be employed for displaying at least a part of a geometric primitive on a display, wherein said original edge vector represents an oriented edge of said geometric primitive, said graphic presentation system comprising said display device and a processing device, said processing device including:

a computing portion for determining one of four quadrants of a Cartesian coordinate system to which an original edge vector belongs due to its orientation;

a quadrant disambiguation portion for transposing an original edge vector into a predetermined one of said four quadrants;

a coverage mask look-up portion for fetching a stored coverage mask, which coverage mask is associated at least indirectly to a transposed edge vector provided by said transposing portion;

a transformation portion for transforming a coverage mask provided by said coverage mask look-up portion to a quadrant determined by said computing portion;

a combining portion for combining transformed coverage masks provided by said transformation portion for a specific pixel and for modifying the color of said pixel for display by said display device based on combined coverage mask;

means for defining representative edge vectors having different, predetermined orientations, said representative edge vectors being distributed by said predetermined orientations in a rotationally symmetric manner to said four quadrants of said Cartesian coordinate system, such that if the set of representative edge vectors defined for one quadrant is rotated in steps of 90°, the resulting edge vectors correspond exactly to the set of representative edge vectors defined for another quadrant; and means for selecting one of said representative edge vectors in said predetermined quadrant, which representative edge vector has a similar orientation as said transposed edge vector;

wherein the coverage mask look-up portion for fetching a stored coverage mask fetches a stored coverage mask which is associated to said selected representative edge vector and thereby indirectly to said transposed edge vector;

wherein a first representative edge vector of said predetermined quadrant lies on a first border to a first neighboring quadrant of said predetermined quadrant;

wherein a representative edge vector lying on a second border to a second neighboring quadrant of said predetermined quadrant constitutes a first representative edge vector of said second neighboring quadrant;

wherein in case said transposed edge vector has a similar orientation as said first representative edge vector of said second neighboring quadrant, said device further comprises means for selecting said first representative edge vectors of said predetermined quadrant as representative edge vector;

wherein the coverage mask look-up portion for fetching a stored coverage mask, fetches a stored coverage mask which is associated to said selected representative edge vector; and wherein said device further comprises means for correcting said fetched coverage mask.

17. A software program product with a program code for determining for a pixel a coverage mask reflecting an orientation of an original edge vector, which pixel is to be employed for displaying at least a part of a geometric primitive on a display, wherein said original edge vector represents an oriented edge of said geometric primitive, which program code is stored on a machine readable carrier, for determining one of four quadrants of a Cartesian coordinate system to which an original edge vector belongs due to its orientation;

transposing an original edge vector into a predetermined one of said four quadrants;

fetching a stored coverage mask which is associated at least indirectly to a transposed edge vector; and transforming said fetched coverage mask to said quadrant to which an original edge vector belongs due to its orientation;

wherein said program code is for execution by a signal processing component;

means for defining representative edge vectors having different, predetermined orientations, said representative edge vectors being distributed by said predetermined orientations in a rotationally symmetric manner to said four quadrants of said Cartesian coordinate system, such that if the set of representative edge vectors defined for one quadrant is rotated in steps of 90°, the resulting edge vectors correspond exactly to the set of representative edge vectors defined for another quadrant; and means for selecting one of said representative edge vectors in said predetermined quadrant, which representative edge vector has a similar orientation as said transposed edge vector;

wherein the coverage mask look-up portion for fetching a stored coverage mask fetches a stored coverage mask which is associated to said selected representative edge vector and thereby indirectly to said transposed edge vector;

wherein a first representative edge vector of said predetermined quadrant lies on a first border to a first neighboring quadrant of said predetermined quadrant;

wherein a representative edge vector lying on a second border to a second neighboring quadrant of said predetermined quadrant constitutes a first representative edge vector of said second neighboring quadrant, wherein in case said transposed edge vector has a similar orientation as said first representative edge vector of said second neighboring quadrant, said device further comprises means for selecting said first representative edge vectors of said predetermined quadrant as representative edge vector;

wherein the coverage mask look-up portion for fetching a stored coverage mask, fetches a stored coverage mask which is associated to said selected representative edge vector; and wherein said device further comprises means for correcting said fetched coverage mask.

* * * * *

UNITED STATES PATENT AND TRADEMARK OFFICE
CERTIFICATE OF CORRECTION

PATENT NO. : 7,006,110 B2
DATED : February 28, 2006
INVENTOR(S) : Crisu et al.

It is certified that error appears in the above-identified patent and that said Letters Patent is hereby corrected as shown below:

<u>Column 24,</u>
Line 57, delete "$de_x$" and insert -- $de_y$ --.

Signed and Sealed this

Twenty-third Day of May, 2006

JON W. DUDAS
*Director of the United States Patent and Trademark Office*